(12) United States Patent
Queck et al.

(10) Patent No.: US 10,183,363 B2
(45) Date of Patent: Jan. 22, 2019

(54) SPACER FORMATION CELL

(71) Applicant: Cardinal IG Company, Eden Prairie, MN (US)

(72) Inventors: Curtis Queck, Spring Green, WI (US); Michael Milewski, Poynette, WI (US); Robert Buchanan, Spring Green, WI (US); Erik Carlson, Spring Green, WI (US); James Newman, Prairie Du Sac, WI (US)

(73) Assignee: Cardinal IG Company, Eden Prairie, MN (US)

( * ) Notice: Subject to any disclaimer, the term of this patent is extended or adjusted under 35 U.S.C. 154(b) by 612 days.

(21) Appl. No.: 14/818,087

(22) Filed: Aug. 4, 2015

(65) Prior Publication Data

US 2017/0037675 A1 Feb. 9, 2017

(51) Int. Cl.
*B23P 23/04* (2006.01)
*B23P 15/00* (2006.01)
*B21D 11/10* (2006.01)
*E06B 3/673* (2006.01)

(52) U.S. Cl.
CPC .............. *B23P 15/00* (2013.01); *B21D 11/10* (2013.01); *B23P 23/04* (2013.01); *E06B 3/67313* (2013.01); *B23P 2700/08* (2013.01)

(58) Field of Classification Search
CPC . B23P 23/04; Y10T 29/49623; Y10T 29/5138
USPC .......... 72/295–299, 306, 307, 319, 387, 388
See application file for complete search history.

(56) References Cited

U.S. PATENT DOCUMENTS

| 2,942,644 | A | 6/1960 | Beranek |
| 4,100,780 | A | 7/1978 | Sassak |
| 4,261,145 | A | 4/1981 | Bröcking |
| 4,356,614 | A | 11/1982 | Käuferle et al. |
| 4,462,237 | A | 7/1984 | Käuferle et al. |
| 4,574,553 | A | 3/1986 | Lisec |
| 4,590,779 | A | 5/1986 | Stange et al. |
| 4,597,279 | A | 7/1986 | Lisec |
| 4,627,263 | A | 12/1986 | Bayer et al. |

(Continued)

FOREIGN PATENT DOCUMENTS

EP          0192921 B1 * 5/1988  ......... B23K 11/0073

OTHER PUBLICATIONS

English translation EP 0192921 Lisec.*

*Primary Examiner* — Jason L Vaughan
*Assistant Examiner* — Amanda J Meneghini
(74) *Attorney, Agent, or Firm* — Fredrikson & Byron, P.A.

(57) ABSTRACT

A spacer formation cell usable in configuration of a window assembly, wherein the cell includes a plurality of stages through which a spacer work piece is routed, and the stages include a holding stage, a cutting stage, a bending stage, and a connecting stage. The stages can be arranged in interlinked configuration, enabling spacers to be fabricated in a direct and time-efficient manner. The stages can be interlinked to form a framework, forming an exterior enclosure for the stages of the cell, and enabling at least of the majority of the cell's operations to be readily overseen by an operator from single vantage points around the cell. The configuration of the formation cell enables a wide variety of spacer types and/or sizes to be readily processed, with such processing to be readily alternated.

16 Claims, 18 Drawing Sheets

(56) References Cited

U.S. PATENT DOCUMENTS

| | | |
|---|---|---|
| 4,754,632 A | 7/1988 | Dahl |
| 4,803,764 A | 2/1989 | Lenhardt et al. |
| 4,836,005 A * | 6/1989 | Lisec ................ E06B 3/67313 |
| | | 72/306 |
| 4,885,926 A | 12/1989 | Lisec |
| 4,912,837 A | 4/1990 | Bayer |
| 4,945,619 A | 8/1990 | Bayer |
| 5,117,669 A | 6/1992 | Lisec |
| 5,136,871 A | 8/1992 | Lisec |
| 5,161,401 A | 11/1992 | Lisec |
| 5,181,412 A | 1/1993 | Lisec |
| 5,394,725 A | 3/1995 | Lisec |
| 6,023,956 A | 2/2000 | Bayer |
| 6,678,934 B1 | 1/2004 | LaSusa |
| 7,117,576 B2 | 10/2006 | LaSusa |
| 7,448,246 B2 | 11/2008 | Briese et al. |
| 2012/0011722 A1 | 1/2012 | Briese et al. |
| 2014/0260491 A1 | 9/2014 | Briese et al. |

\* cited by examiner

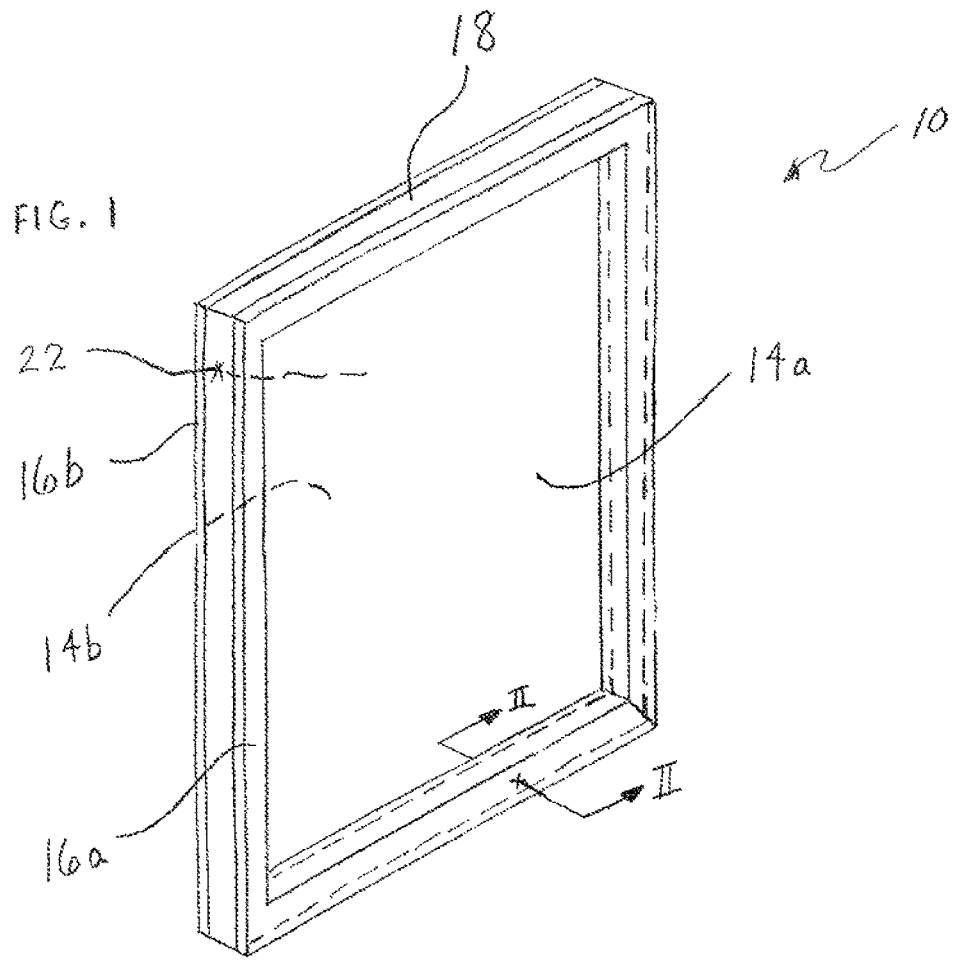
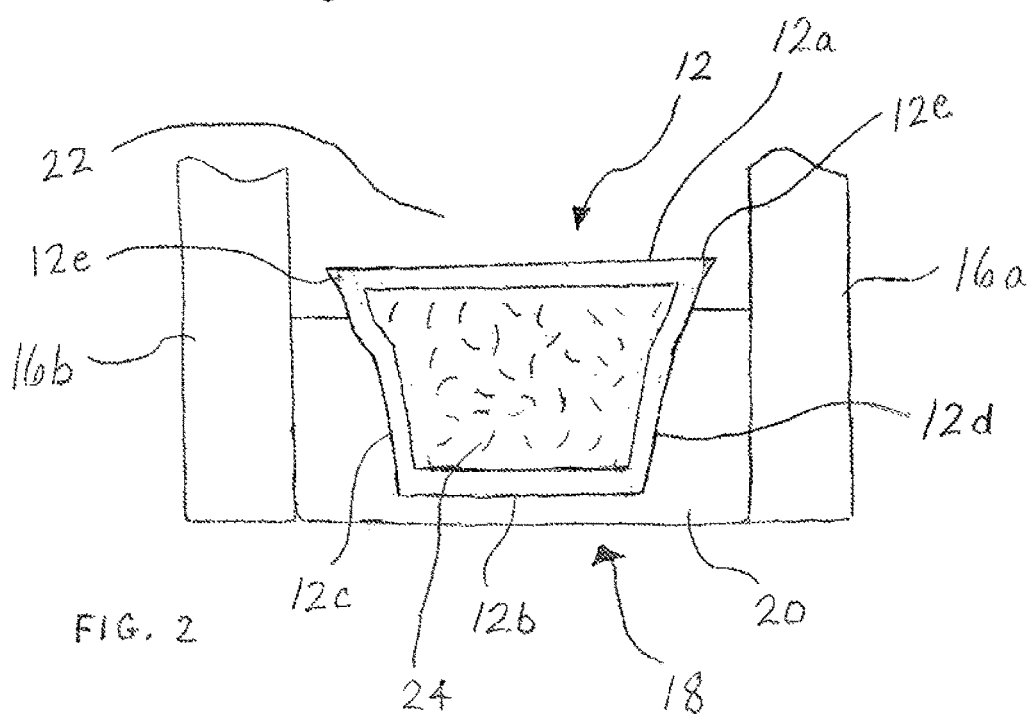

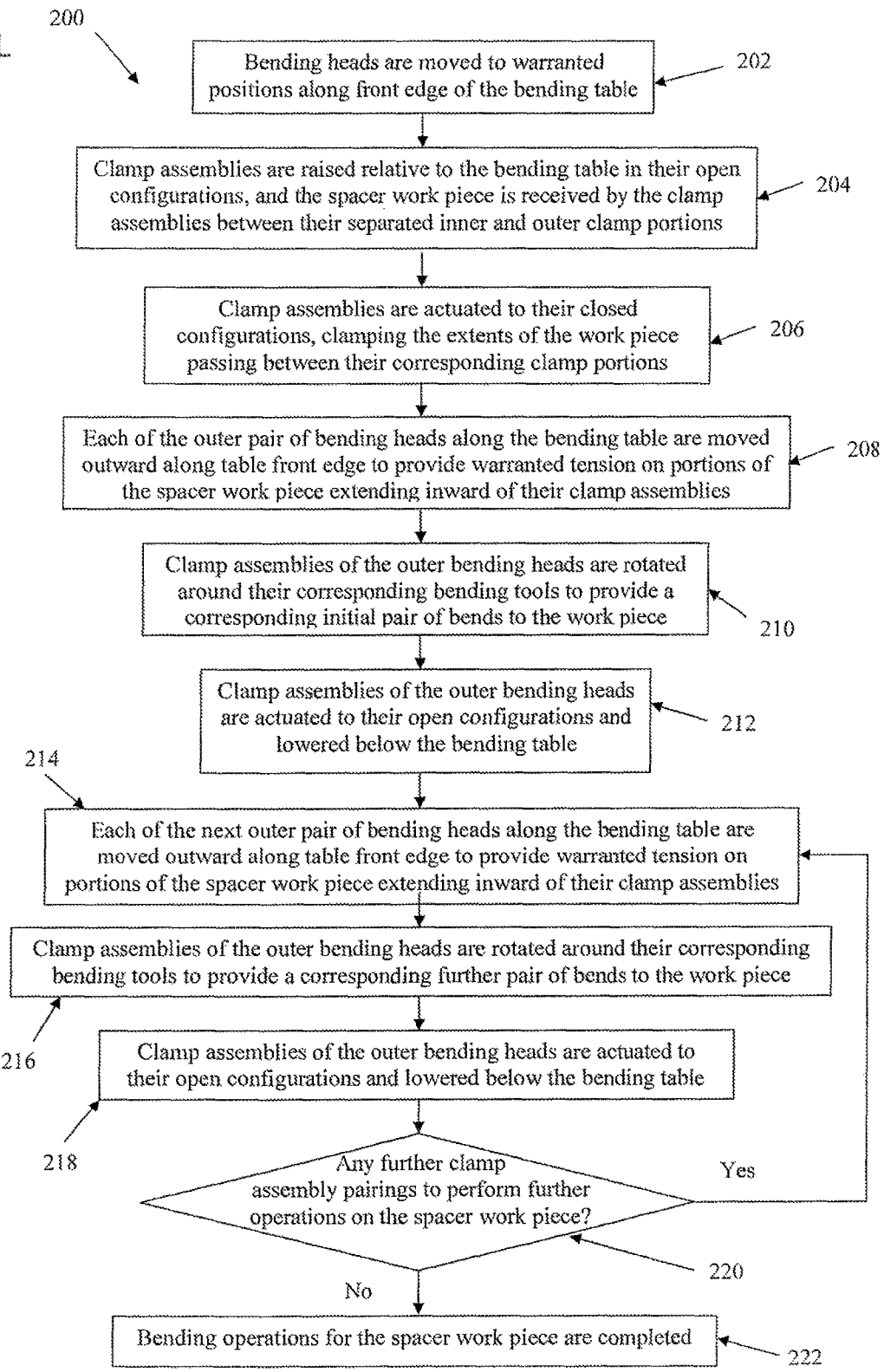

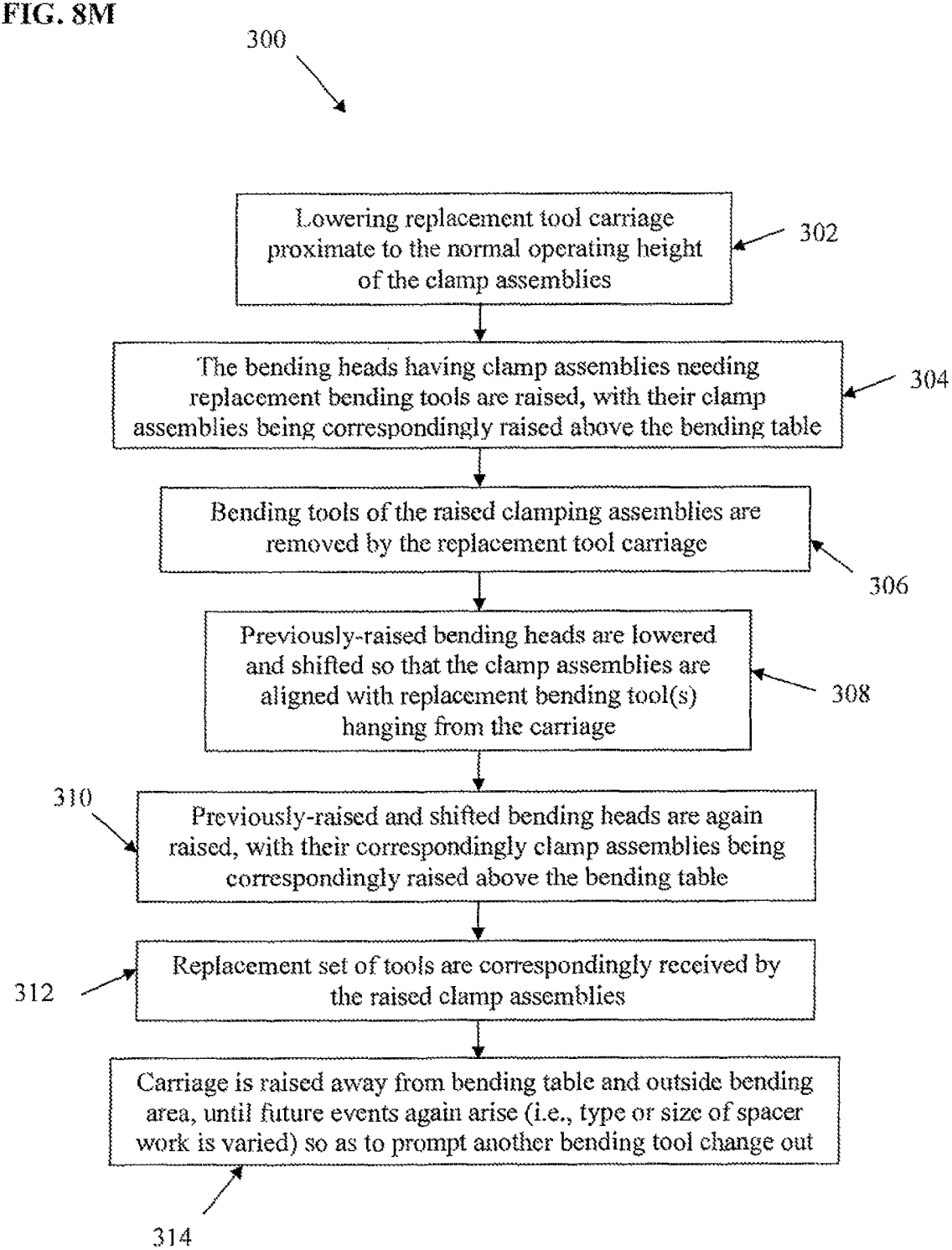

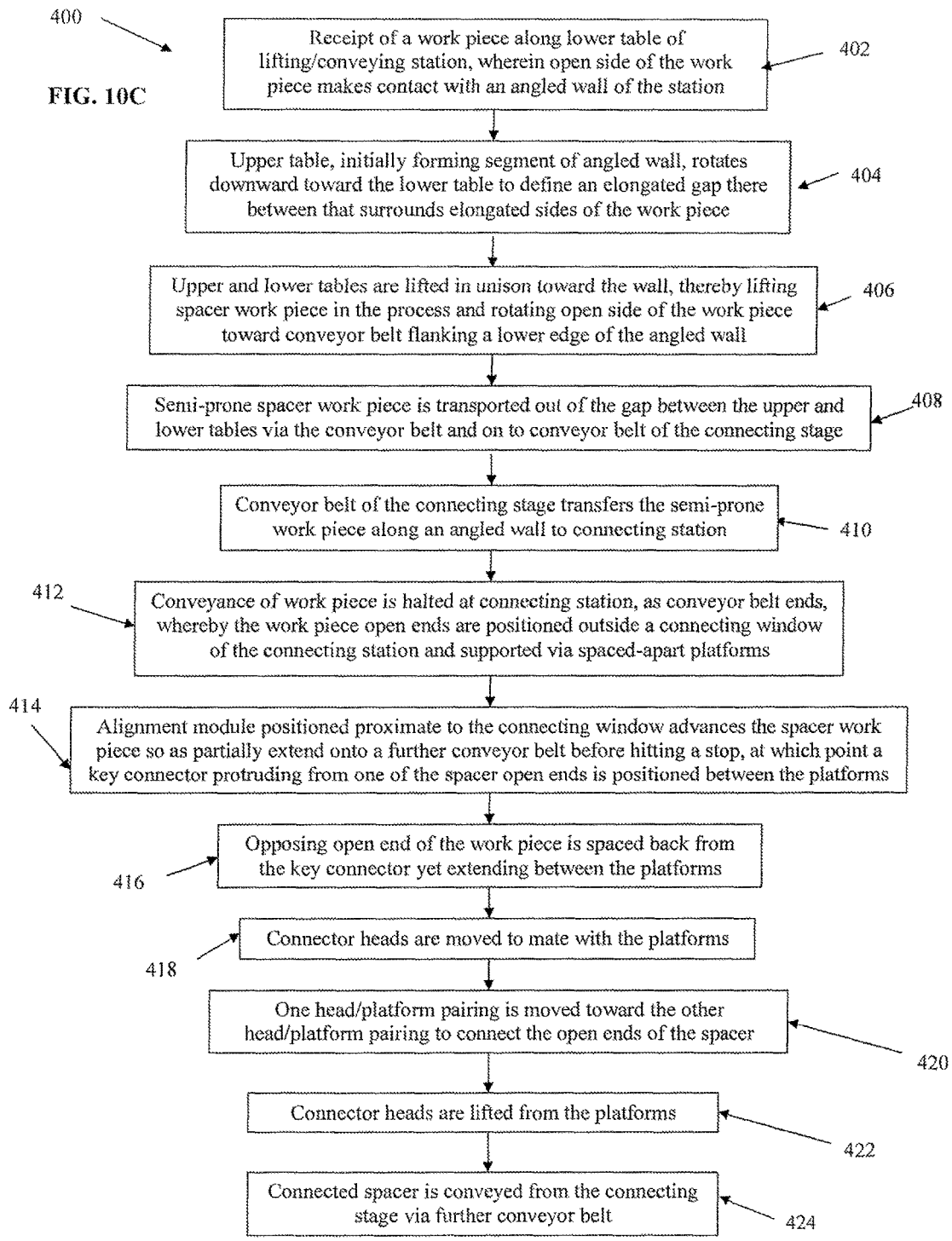

SPACER FORMATION CELL

FIELD OF THE INVENTION

The present invention relates generally to spacers used for window assemblies. More particularly, this invention relates to systems and methods for forming such spacers.

BACKGROUND

As is generally known, insulating glass units (IGUs) are used in window and door applications, and during cold weather, are effective in minimizing loss of heat there through from building interiors. An IGU is formed with a pair of glass sheets spaced apart via an interlayer that is positioned along the peripheries of the sheets. The interlayer, typically formed of a spacer (or spacer assembly) and sealant material, functions in creating a sealed interior space for the IGU, i.e., between the glass sheets. Particularly, the sealant material bonds the spacer to each of the sheets. In general, the margins of the glass sheets are positioned to be flush with or extend slightly outward from the spacer, and the sealant material is used to fill in the gaps there between (extending between the spacer and each of the sheets along their peripheries) so that the space created between the sheets (i.e., internal to the IGU) is hermetically sealed.

A spacer is typically formed of a sturdy yet flexible material (e.g., often metal, such as aluminum) of elongated length that is cut to size and bent into desired shape for an intended window assembly (e.g., IGU). The spacer has a frame structure, defining a longitudinal hollow channel along its length. In the case of the spacer being intended for an IGU, a desiccant is commonly provided within the channel of the spacer for absorbing atmospheric moisture that becomes trapped within the IGU (i.e., in the space created between the IGU's glass sheets). Conventionally, spacer manufacture (or formation) requires at least three operations: (1) cutting operation, (2) bending operation, and (3) connecting operation. In the cutting operation, a spacer work piece is cut to a requisite length. Subsequently, in the bending operation, the cut spacer work piece is bent along its length so as to form corners therein (most often, four corners), thereby defining a shape (most often, rectangular) warranted for an intended window assembly. Finally, the two opposing ends of the spacer frame are connected so as to form a closed loop for the spacer.

A drawback of some of the known approaches for manufacturing spacers has been lengthy fabrication time. For example, with some approaches, one or more of the formation steps are performed at separate areas on the factory floor, such that time is added to the overall process in collecting and shuttling the spacer material between the areas. In some cases, this can involve spacer work pieces being cut to size in one area, while the work pieces are bent and connected in another area. To that end, a plurality of different types and/or sizes of spacer work pieces may be cut in advance so as to be available as needed, e.g., for batch processing. However, this would warrant further time being added to the fabrication process, i.e., in locating the requisite spacer type/size needed for the job order.

Continuing with the assembly time for manufacturing spacers, the longest amount of time is often dedicated to the bending operation. For example, in many known processes, the bends are performed one at a time. For instance, for each spacer work piece, a portion of the work piece is often positioned in front of a tooling head, and then bent around the tooling head to form a corner therein. This process is then repeated in forming each corner. Furthermore, in many cases, portions of the spacer work pieces at which the corners are formed are often pre-formed (e.g., deformed or partially cut) so as to be better configured to be bent. While such pre-forming can help reduce the amount of stress at such spacer portions during corresponding bending operations (thereby minimizing risk of irregularities at such portions), it unfortunately also adds complexity and further time to the overall process, particularly if such pre-forming is conducted just prior to a bending operation.

A further drawback of known spacer manufacturing processes has involved the preparation time leading up to the formation of the spacers. Particularly, time is often needed to vary the assembly process each time differing types and/or sizes of spacer work pieces are used. For example, this often requires loading the differing size/type work pieces and/or changing out the tooling for appropriate bending of the work pieces.

Embodiments of the present invention are intended to the address the above-described challenges, as well as others, relating to spacer production.

SUMMARY OF THE INVENTION

In some embodiments, a cell for forming a spacer usable in configuration of a window assembly is provided. The cell includes a plurality of stages through which a spacer work piece is routed. The stages include a holding stage, a cutting stage, a bending stage, and a connecting stage. The stages are arranged in an interlinked configuration and grouped together via a framework. The framework forms an exterior enclosure for the stages of the cell. The holding stage includes a plurality of holding stations in which different spacer work pieces are separately retrievable. The cutting stage includes a cutting station equipped with cutting tool. A transport mechanism is included and configured to transfer a spacer work piece from the holding stage to the cutting stage and locate the work piece relative to the cutting tool for cutting operation. The bending stage includes a plurality of bending heads and a bending table. The bending heads are aligned and in spaced-apart orientations with an edge of the table and selectively movable along the bending table edge. Each bending head is equipped with a clamp assembly. The clamp assemblies being vertically displaceable relative to the bending table. The clamp assemblies seat corresponding bending tools therein. The clamp assemblies are configured for securing retaining extents of the spacer work piece and being entirely rotatable about the tools. The connecting stage includes an angled wall, a pair of connecting heads, and a transport mechanism. The transport mechanism comprises a pair of spaced apart conveyor belts separated by a connecting window defined in the wall. The connecting heads extend from the connecting window and are configured to mate with corresponding pair of platforms situated between the spaced-apart conveyor belts, whereby positioning of the open ends of the spacer work piece between the platforms enables the connecting heads to mate and shift collectively with the stations in joining the open ends together.

In additional embodiments, a station used in shaping a spacer work piece intended for a window assembly is provided. The station includes a bending table, a plurality of bending heads, and a carriage. The plurality of bending heads are aligned and in spaced-apart orientations with an edge of the table and selectively movable along the bending table edge. Each bending head is equipped with a clamp assembly. The clamp assemblies are vertically displaceable relative to the bending table. The clamp assemblies seat corresponding bending tools therein. The clamp assemblies are configured for securing retaining extents of the spacer work piece and being entirely rotatable about the tools. The carriage carries a plurality of replacement bending tools from an underside of the carriage. The carriage is situated above and vertically displaceable relative to the bending table, wherein the clamp assemblies are alignable with the replaceable bending tools of the carriage.

In other embodiments, a method of bending a spacer work piece intended for a window assembly is provided. The method is conducted with at least two pairs of bending heads and a bending table. Each bending head includes a clamp assembly. The clamp assemblies are aligned in spaced-apart configuration with a front edge of the bending table. The method includes steps of receiving the spacer work piece with the clamp assemblies in open configuration, wherein the spacer work piece spans across the spaced-apart clamp assemblies; closing the clamp assemblies, thereby clamping extents of the spacer work piece extending therein; moving one or more of an outer pair of the bending heads outward along the bending table front edge, thereby providing warranted tension of portions of the spacer work piece extending inward from the clamp assemblies of the outer pair of bending heads; rotating the clamp assemblies of the outer pair of bending heads around bending tools of the same clamp assemblies, thereby providing a corresponding a first pair of bends to the spacer work piece; opening the clamp assemblies of the outer pair of bending heads; lowering the clamp assemblies of the outer pair of bending heads below the bending table; and repeating the moving, rotating, opening, and lowering steps in succession for next outer pairs of bending heads along the bending table front edge.

In further embodiments, a method of changing bending tools from bending heads at a station for bending a spacer work piece intended for a window assembly. The method is conducted with a plurality of bending heads, a carriage carrying a plurality of replacement bending tools from an underside of the carriage, and a bending table. Each bending head includes a clamp assembly. The clamp assemblies are aligned in spaced-apart configuration with a front edge of the bending table. The carriage is situated above and vertically displaceable relative to the bending table. The method includes steps of lowering the carriage proximate to the bending table; raising the clamp assemblies of one or more of the bending heads; transferring bending tools of the raised clamp assemblies to corresponding open tool receptacles provided on underside of the carriage; lowering the clamp assemblies of the one or more bending heads; shifting positions of the one or more bending heads to align their corresponding clamping assemblies with corresponding ones of the replacement bending tools carried by the carriage; raising the aligned clamping assemblies; and transferring the corresponding ones of the replacement bending tools to the raised and aligned clamping assemblies.

In additional embodiments, a method of orienting and connecting open ends of a spacer work piece intended for a window assembly is provided. The method includes steps of receiving the spacer work piece along a lower table, the lower table operably coupled to an angled wall, wherein an open side of the work piece makes contact with the angled wall; lowering an upper wall downward toward the lower table to define an elongated gap between elongated sides of the work piece; lifting the upper and lower tables in unison toward the angled wall, thereby lifting the spacer work piece and rotating the open side of the work piece toward a transport mechanism flanking a lower edge of the angled wall such that the work piece is provided in a semi-prone orientation; transporting the spacer work piece out of the gap between the upper and lower tables via the transport mechanism to a connecting station, where open ends of the open side of the spacer work piece are positioned outside a connecting window and supported via a pair of spaced-apart platforms; positioning the open ends of the spacer work piece between the spaced-apart platforms in a spaced-apart orientation; moving a pair of connector heads from the connecting window so to correspondingly mate with the platforms, thereby clamping extents of the open side of the spacer work piece there between, such extents offset from the open ends; and moving one of the connector heads toward the other of the connector heads, thereby connecting the open ends via use of a key connector inserted in one of the open ends of the spacer work piece; other head/platform pairing to connect the open ends of the spacer work piece.

BRIEF DESCRIPTION OF THE DRAWINGS

The following drawings are illustrative of particular embodiments of the present invention and therefore do not limit the scope of the invention. The drawings are not necessarily to scale and are intended for use in conjunction with the explanations in the following detailed description. Embodiments of the invention will hereinafter be described in conjunction with the appended drawings, wherein like numerals denote like elements.

FIG. 1 is a perspective view of an exemplary insulated glass unit;

FIG. 2 is a cross-sectional view of the insulated glass unit of FIG. 1, taken along dividing line II-II and showing cross-sectional view of a spacer of the unit;

FIG. 8L is a flow diagram of exemplary steps performed in shaping a spacer work piece at the bending stage of FIGS. 8A and 8B in accordance with certain embodiments of the invention;

FIG. 8M is a flow diagram of exemplary steps performed in changing bend tooling from clamp assemblies of banding heads at the bending stage 34 of FIGS. 8A and 8B in accordance with certain embodiments of the invention;

FIG. 10C is a flow diagram of exemplary steps performed in orienting and connecting open ends of a spacer work piece in accordance with certain embodiments of the invention.

DETAILED DESCRIPTION

Figure 3A:
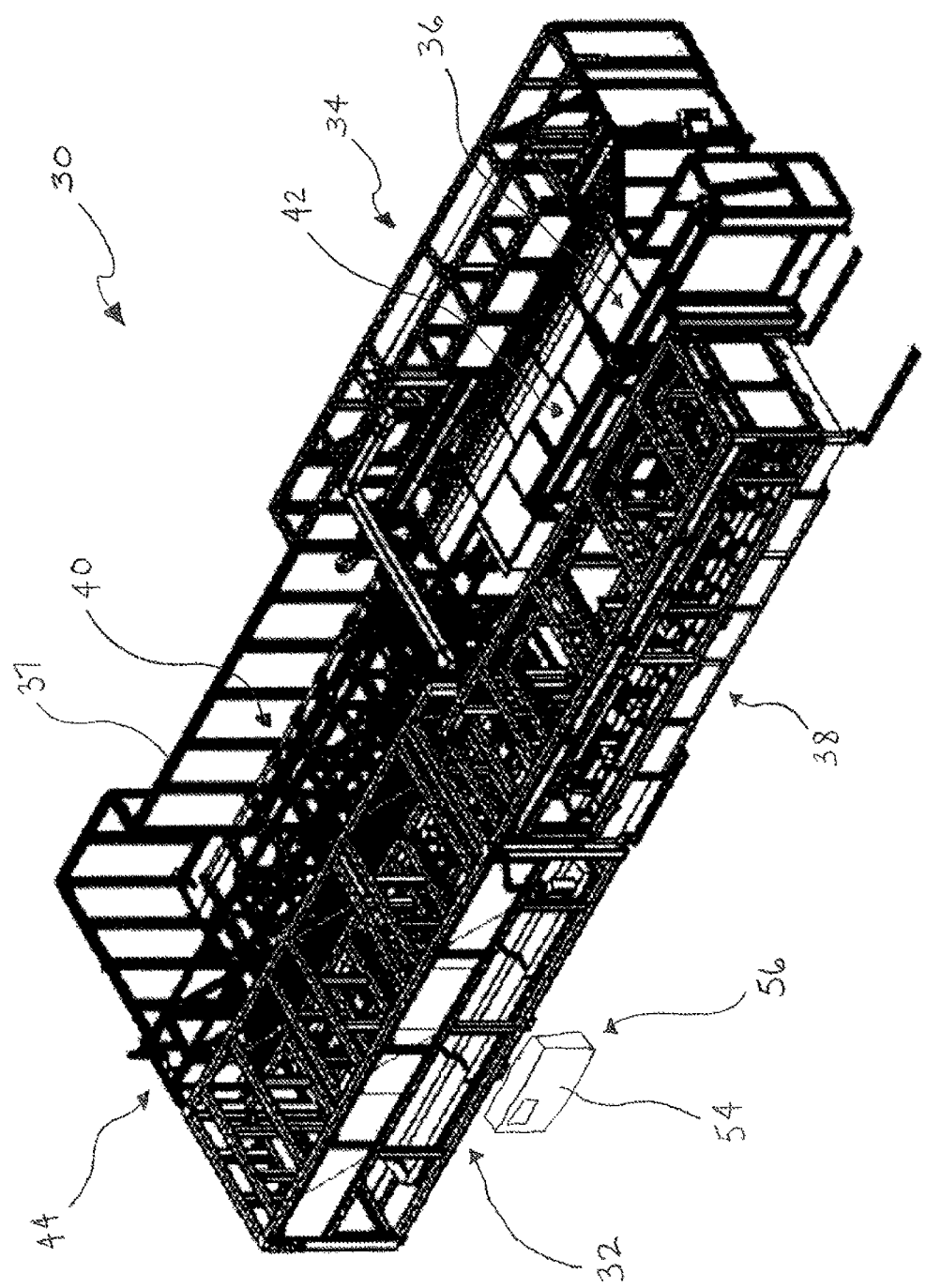
FIGS. 3A and 3B are overhead perspective and plan views of a formation cell for fabricating spacers in accordance with certain embodiments of the invention.

The following detailed description and accompanying drawings are exemplary in nature and are not intended to limit the scope, applicability, or configuration of the invention in any way. Rather, the description and drawings provide some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

As already noted above, embodiments of the invention focus on systems and methods for fabricating a spacer (or spacer assembly), which is intended for subsequent use in a window assembly. Particularly, the embodiments focus on a formation (or production) cell and the plurality of stages (or staging areas) thereof, through which spacer work pieces are passed in producing a spacer end product. As detailed herein, by collectively incorporating such plurality of stages, the formation cell is configured to be both efficient in use and versatile in function. For example, the stages of the cell are provided in an interlinked configuration, which enables spacers to be fabricated in a direct and time-efficient manner. To that end, by situating the stages to be in a rectangular-shaped grouping, the footprint for the formation cell can be made widely applicable to factory floors, while also enabling a majority of the cell's operations to be readily overseen by an operator from single vantage points around the cell. As will be appreciated, the configuration of the formation cell enables a wide variety of spacer types and/or sizes to not only be readily processed, but with such processing to be readily alternated, as is desired. While there is focus herein with respect to how the stages of the production cell function collectively, it should be appreciated that many of the individual stages, when separately considered, also offer advances over known systems and techniques.

As alluded to above, IGUs are one type of window assembly in which spacers are used. FIG. 1 shows a front perspective view of an exemplary insulating glass unit (IGU) 10, while FIG. 2 illustrates a cross-sectional view of the IGU 10, showing spacer 12 therein. Starting with FIG. 1, the IGU 10 is formed with a pair of opposing glass sheets 14a, 14b (with frame portions 16a, 16b, respectively, provided on their peripheries) held apart by an interlayer 18.

The interlayer 18, with reference to FIG. 2, is formed of the spacer 12 and surrounding sealant material 20 that joins the spacer 12 to the framed sheets 14a, 14b. As already described herein, the interlayer 18 is limited to the periphery of the IGU 10, so as to form an interior space (or cavity) 22 for the IGU 10 that is hermetically insulated from the outside atmosphere. In general, the sealant material 20 can be formed from a "hot melt" material, and when added between the framed sheets 14a, 14b about their peripheries, later hardens to form a U-shaped cross section around the IGU 10, as shown in FIG. 2. As further shown, a desiccant 24 is provided inside the spacer 12, and functions in removing water vapor from air, or other volatiles, entrapped in the space 22 during construction of the IGU 10.

The interlayer 18 extends about the IGU's periphery to provide a structurally strong, stable interface for maintaining alignment and spacing of the framed sheets 14a, 14b, while minimizing heat conduction of the IGU 10 via the space 22 created between the sheets 14a, 14b. In its initial form, the spacer 12 is defined as an elongated structure, and, with reference to FIG. 2, has a channel-shaped cross section, defining inner and outer walls 12a, 12b and opposing lateral walls 12c, 12d along its extent. While the walls of the spacer are shown to be of particular quantity, and are further shown to have particular shape and orientation relative to each other, it should be appreciated that such characteristics are exemplary. However, as is further shown and which is typical for spacers, projecting portions 12e (commonly referred to as ears) are generally provided at corners of at least one of the walls (often the inner wall 12a), and are used for handling the spacer during formation.

In forming a spacer that can be later used in constructing a window assembly, many factors must be considered. For example, the form of the spacer work piece that one starts with (prior to it being processed to final form) is an important consideration. The spacer formation cell described herein, in certain embodiments, is configured to function with elongated pieces of spacer channel. To that end, such spacer work pieces need to be correspondingly cut (to requisite length), bent (to requisite shape), and connected (to form closed loop) in forming a spacer end product usable in window assembly construction. As such, starting with such elongated spacer channel work pieces, this series of operations is provided via use of the aforementioned formation cell, the embodiments for which are described herein.

Figure 3B:
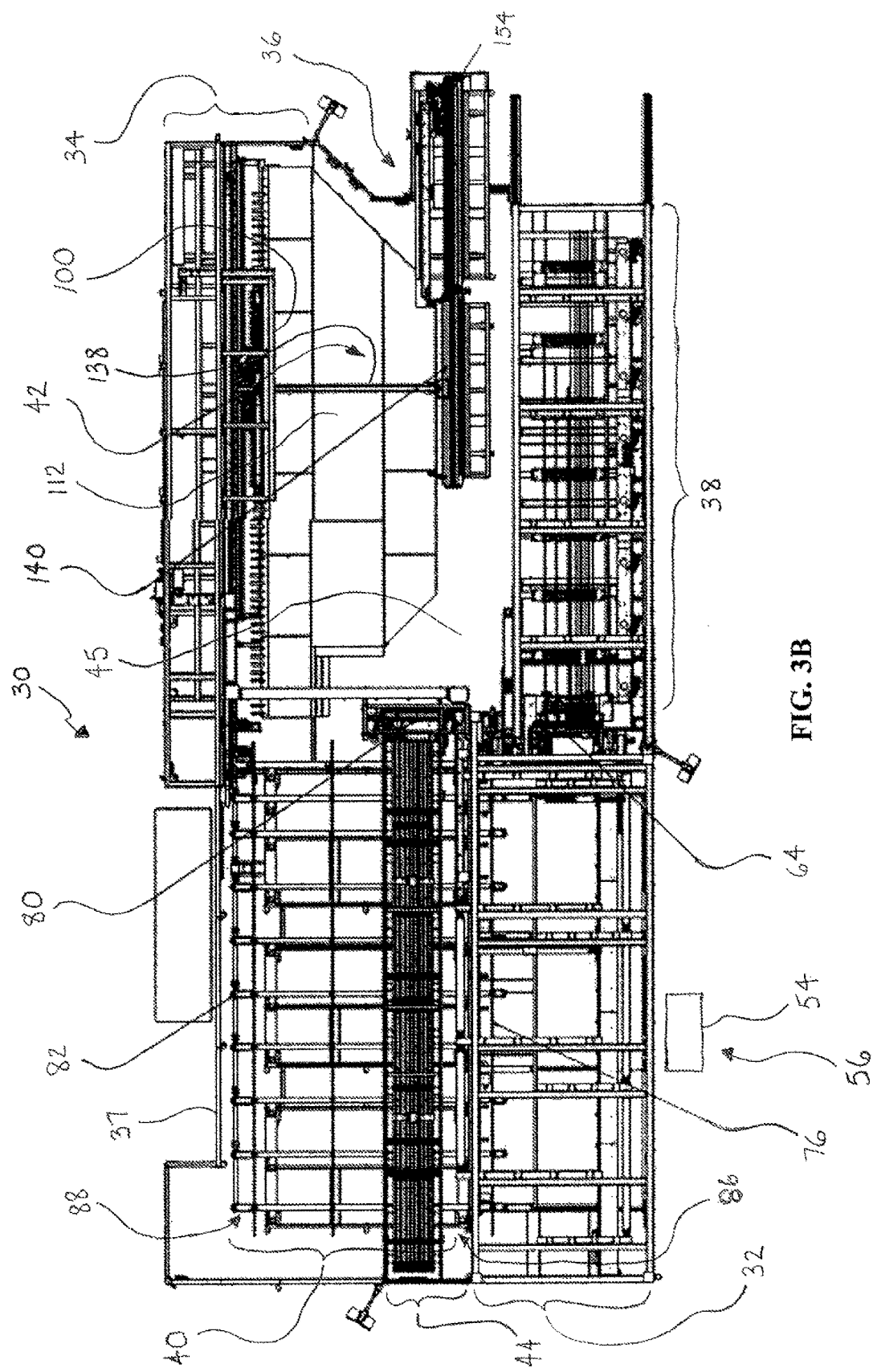

FIGS. 3A and 3B show bird's eye perspective and overhead views of the spacer formation cell 30 in accordance with certain embodiments of the invention. As described above, the cell 30 is formed of a plurality of stages (or staging areas), through which spacer work pieces are directed so as to be progressively formed into a desired spacer end product, i.e., for use with an intended window assembly, such as an IGU. One such stage 32 (detailed below with reference to FIG. 5) is focused on cutting a spacer work piece to desired length. Downstream of such cutting stage 32, another stage 34 (detailed below with reference to FIGS. 8A-8K) is concerned with bending the cut spacer work piece into desired shape by forming corners at different locations along its extent. Downstream of the bending stage 34, a further stage 36 (detailed below with reference to FIGS. 10A and 10B) is focused on connecting the opposing ends of the bent spacer work piece, thereby forming closed loop for spacer end product.

While the operations performed in the cutting, bending, and connecting stages 32, 34, and 36 are needed in forming a spacer for an intended window assembly, in certain embodiments as shown, the production cell 30 includes further stages. For example, some of these further stages (e.g., stages 38, 40, and 42) can be intended for transferring and/or reorienting a spacer work piece with regard to one or more of the cutting, bending, and connecting stages 32, 34, 36. In other cases, the further stages (e.g., stage 44) can be intended for additional operation(s) being performed on the spacer work piece. The cutting, bending, and connecting stages 32, 34, 36, as well as exemplary further stages, will be later detailed herein. However, at this point, the collective functioning of these stages is focused upon.

For example, by incorporating each of the principal cutting, bending, and connecting operations in corresponding stages 32, 34, and 36 of the formation cell 30, spacer fabrication times can be minimized. For instance, time is not needed to collect and transfer spacer work pieces from separate areas on the factory floor. As noted above, such is conventionally known to be the case when batches of spacer work pieces are prepped in advance (i.e., cut to desired length and/or pre-formed for later bending). Such prepped work pieces are often stored until they are later needed, whereupon type and size of prepped work pieces are pulled and transferred to stations for bending and connecting. By way of comparison, the formation cell 30 performs each of cutting, bending, and connecting operations in a continuous, sequential manner by incorporating corresponding stages 32, 34, 36 and situating such stages in an interlinked configuration.

Looking back to FIG. 3A, in describing the stages of the formation cell 30 to be interlinked, in certain embodiments, the stages are grouped together via a metal framework 37, which collectively forms an open-air exterior enclosure for the cell 30. In certain embodiments, a majority of the open air areas defined on the sides of the metal framework 37 are closed via positioning of sheets of transparent material (e.g., acrylic or PlexiGlass®) thereat, thereby forming more of an enclosed area for the cell 30. In enabling the cell's stages to be interlinked, the formation processes performed therein are all-inclusive, i.e., from beginning stage to ending stage, a final spacer product is produced, without need of any further external processes. Permitting the cell's stages to be interlinked is at least partially attributable to the bending operation performed in the cell 30. Particularly (and as is later detailed herein), the bending operation warrants no corresponding pre-forming of the spacer work pieces along the areas to be bent, and, as the need arises, can be varied for differing types and/or sizes of spacer work pieces passed through the cell 30. Accordingly, not only does the formation cell 30 enable spacers to be produced in a "made to order" fashion, but the cell 30 offers great versatility, as different types and sizes of spacers can be readily produced and the production of such differing spacers can be readily alternated.

Figure 4:
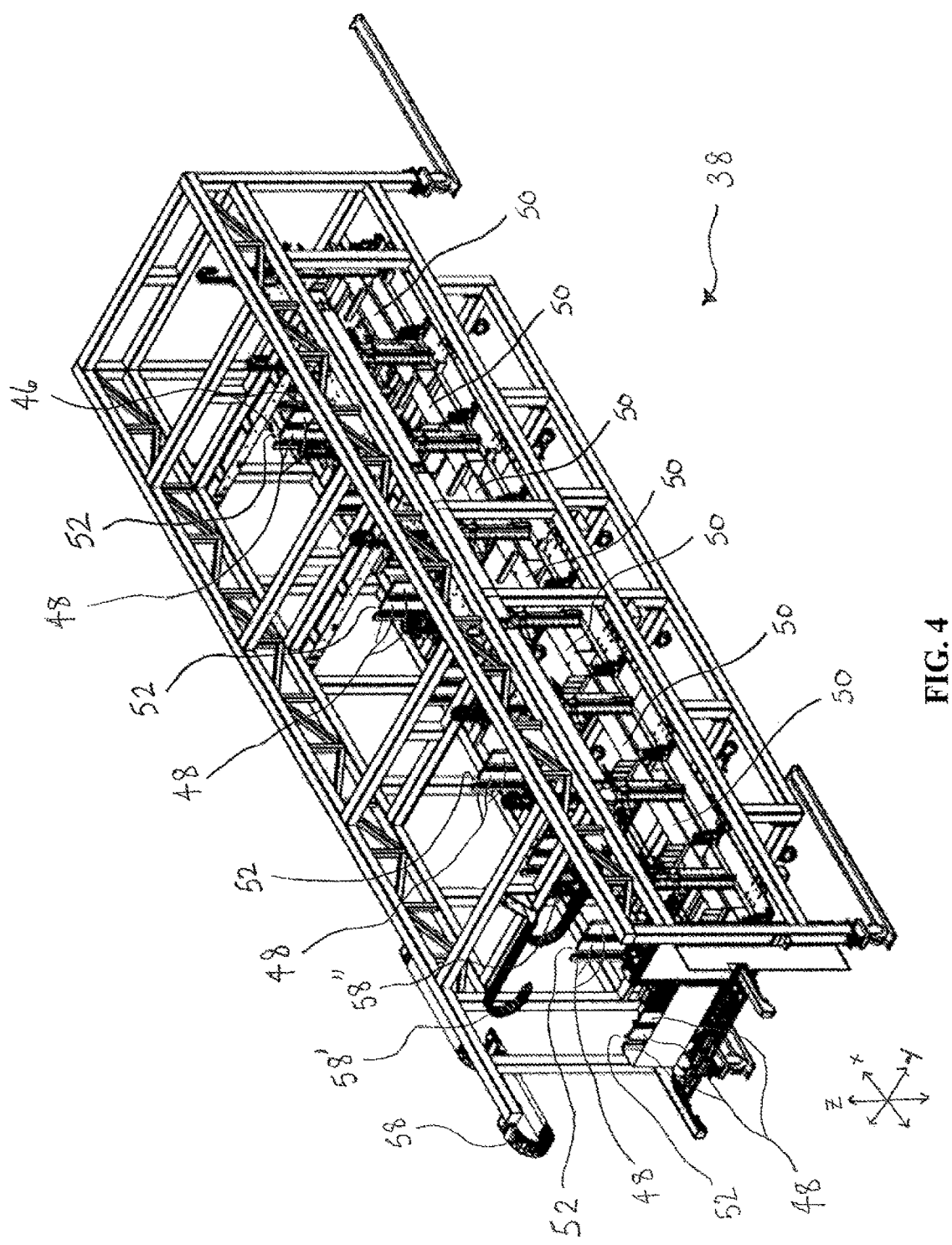
FIG. 4 is an overhead perspective view of a holding stage of the formation cell of FIGS. 3A and 3B in accordance with certain embodiments of the invention.

Carrying over from the above, the formation cell 30 is provided with a holding stage 38 (as already referenced above yet not detailed). In certain embodiments, quantities of differing types (e.g., material types) and sizes (e.g., width, depth, length) of spacer work pieces can be provided in the holding stage 38, whereby such pieces can be readily retrieved (or alternated there between) as desired, for processing within the cell 30. FIG. 4 is an overhead perspective view of the holding stage 38 (shown separate from the other stages of the formation cell 30) in accordance with certain embodiments of the invention. The holding stage 38 includes a plurality of holding stations 46, each of which, in certain embodiments, is formed by pairs of spaced-apart plates 48 that extend vertically from horizontal planks 50 and are at aligned locations across a length of the stage 38. Between each aligned pair of plates 48, an opening 52 is defined. As the plate pairings are aligned for each holding station 46, their corresponding openings 52 are likewise aligned so as to collectively form channels in which the spacer work pieces can be slid and stacked so as to extend across the length of the stage 38. The holding stations 46 are spaced across a width of the stage 38, and thus collectively avail a plurality of types and/or sizes of spacer work pieces to be separately inventoried in the holding stage 38, so that work pieces can be readily retrieved for formation within the cell 30. In certain embodiments, the aligned plates defining one side of the openings 52 for one or more of the holding stations 46 are selectively moveable along their horizontal planks 50 so as to vary width of the openings 52. As such, the holding stations 46 can be adjusted, as needed, to accommodate differing widths of spacer work pieces therein.

With reference back to FIG. 3B, while incorporating the holding stage 38 enables a plurality of differing types and sizes of spacer stock to be readily retrieved/conveyed through the formation cell 30, its inclusion correspondingly increases the footprint (or area of factory floor) accommodated by the cell 30. However, in certain embodiments as shown, the stages of the cell 30 can be configured in a rectangular-shaped grouping, such that their collective footprint is made applicable to wide varieties of factory floors. Moreover, when configured in such a rectangular grouping, an operator can readily observe at least a majority of the stages (and in certain cases, all stages) of the cell 30 from single vantage points around the cell 30. While this objective could be considered one of convenience, it has particular significance when considering manpower needed in overseeing the varied operations of the cell 30. For example, in certain embodiments as will be later appreciated, the stages can be provided in looping arrangement, such that the spacer work pieces passed there through are conveyed in roundabout, e.g., clockwise, manner. In certain embodiments as shown, the formation cell 30 can define an inner vacant area 45 from which an operator can readily observe all the stages of the cell 30 simply by turning his/her head.

As described above, the holding stage 38 enables differing types and sizes of spacer work pieces to be retrieved and conveyed through the formation cell 30. To that end, operations of the cell 30 are dictated by parameters of the spacer work pieces, but even more so by parameters of the window assembly for which the formed spacer is intended. For example, the spacer work piece is cut to a specific length and bent in particular locations along its length in order to form a shape that will correspond with the size and shape of its intended window assembly. Additionally, when type and/or size of the spacer work piece are alternated, the tooling used with the bending heads at the bending stage 34 often needs to be correspondingly varied. In certain embodiments, such operation parameters, and variations thereto, are monitored and controlled from a single location, via use of a computer system 54. In certain embodiments, the system 54 is part of a user interface station 56 that is positioned along the outer periphery of the cell 30. The computer system 54, in certain embodiments, is electrically linked to one or more controllers (e.g., microprocessor-driven) communicating with stages of the cell 30 (via machinery therein). In certain embodiments, operation parameters of the cell 30 for differing spacer work jobs are programmed in storage of the computer system 54. As such, when a particular work job is selected (e.g., from drop down menu of the computer system 54), corresponding operation parameters are retrieved from memory (based on spacer size/type and intended window assembly information) and corresponding instructions are transmitted from the computer system 54 to the one or more controllers to orchestrate the operations (which may also include reconfiguring the equipment for the operations) of the cell 30 accordingly.

In continuing with the above, upon transmitting operation instructions from the computer system 54 to the one or more controllers for a particular spacer job, the controllers drive corresponding equipment within the stages of the formation cell 30. Regarding the one or more controllers, in certain embodiments, they can be housed in the interface station 56 or in undercarriage of the cell 30, and as such, are not shown in the drawings herewith. In certain embodiments, the configuration of the one or more controllers can involve a single master controller that serves as an intermediary between the computer system 54 and a plurality of slave controllers, which direct corresponding operations of the cell 30. However, other configurations could alternatively be used. For example, a single controller module communicating with the computer system 54 could be used to direct equipment for all operations of the cell 30. Conversely, a plurality of controllers could be used, each controlling different operations of the cell 30 and each directly communicating with the computer system 54. For convenience, further reference to the one or more controllers will be referred to in the plural tense, despite the possible alternative controller configurations described above.

Regarding the equipment that is directed by such controllers, it should be understood that this varies amongst the differing stages of the formation cell 30; however, there are some generalities. For example, the controllers, regardless of the stage, are configured to actuate powering devices to drive underlying equipment to facilitate transport and processing of the spacer work pieces. For instance, with regard to transport of the spacer work pieces within the cell 30, the powering devices can be any of a variety of motors, e.g., servo, pneumatic, etc., while the underlying equipment, in certain embodiments, can include one or more transport mechanisms, e.g., formed of drive belts, conveyors, etc. To that end, in certain embodiments, the transport mechanisms can have extensions operably coupled thereto. Such extensions can be used to handle the spacer work pieces, including those configured for grasping, such as clamps, or simply for supporting, such as "L" brackets. In certain embodiments, specific operation of the extensions can be driven by the same powering devices as noted above or other independent powering devices, e.g., one or more of servo and pneumatic motors, under direction of the controllers.

Turning back to FIG. 4 (showing the holding stage 38), the above-described functioning and corresponding apparatus is put into relative context. Particularly, upon a particular spacer work job being selected by operator via the computer system 54, the work job instructions are transmitted from system 54 to the controllers. In certain embodiments, under command of the controllers, a servo motor (i.e., powering device) directs a plurality of drive belt modules 58, 58', and 58" working in tandem (i.e., transport mechanism) to coordinate positioning of a clamp (i.e., extension) in x (length), y (width), and z (height) directions, respectively, relative to a corresponding one of the holding stations 46 for selection of spacer work piece(s) therefrom. In certain embodiments, the clamp is operably coupled to the drive belt module 58" to be positioned proximate to the work piece (e.g., at a leading end thereof). To that end, the clamp is equipped with opposing jaws to close upon the work piece. Upon clamping onto a selected spacer work piece, the clamp (along with held work piece) is moved via the drive belt module 58 from the one holding station 46 to the cutting station 32. Such process is repeated for the quantity of work pieces entered at the computer system 54 for the job order.

Description of the further stages of the cell 30 follows herein, and particularly the equipment driven by the one or more controllers via powering devices housed within the cell 30. For convenience, further reference to the controllers and powering devices will be limited. To that end, unless otherwise described, it should be appreciated that operations of the equipment within the stages of the cell 30 are driven by such powering devices via direction of the controllers pursuant to operation instructions received from the computer system 54.

Figure 5:
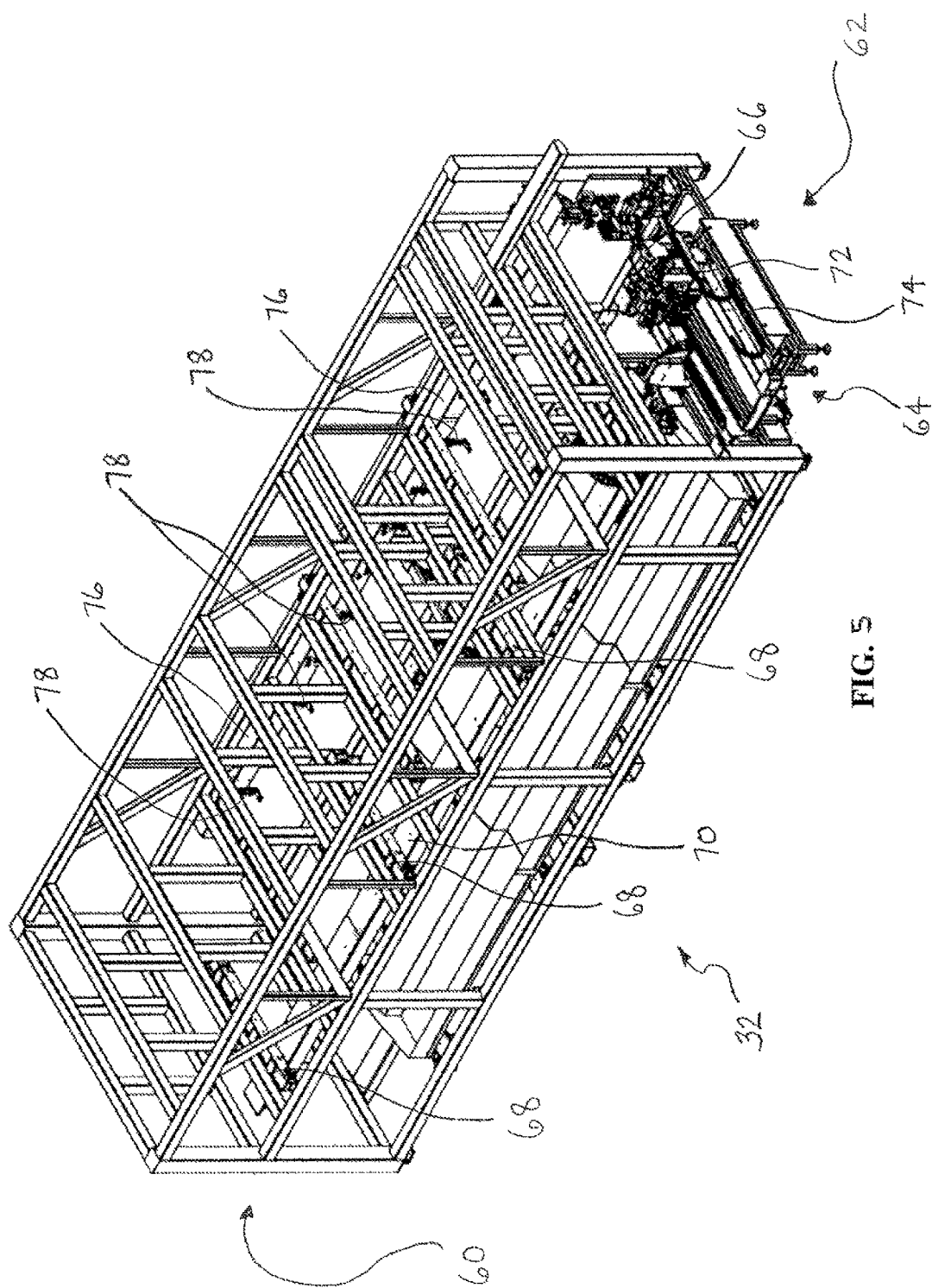
FIG. 5 is an overhead perspective view of a cutting stage of the formation cell of FIGS. 3A and 3B in accordance with certain embodiments of the invention.

As described above, the first processing operation performed in the formation cell 30 occurs at the cutting stage 32, and involves the work piece being cut to a requisite length (pursuant to parameters of the window assembly for which it is intended). FIG. 5 illustrates an overhead perspective view of the cutting stage 32 (shown separate from the other stages of the formation cell 30) in accordance with certain embodiments of the invention. As described above, a spacer work piece is retrieved from the holding stage 38 and transferred to the cutting stage 32. In certain embodiments as described above, this transfer can be conducted via actions of clamp and drive belt modules 58, 58', and 58". With reference to FIG. 5, the spacer work piece is conveyed into the cutting stage 32 so as to extend between stage first end 60 and stage second end 62, whereat work piece extends into a cutting station 64, relative to a cutting tool 66. Once the spacer work piece is so positioned, the clamp releases the same, and is moved back toward the holding station 38 for the next work piece. Once positioned, the portion of the spacer work piece extending into the cutting station 64 is reduced to requisite length by tool 66. In certain embodiments, the tool 66 is moved relative to the work piece so as to contact and cut the piece. The cutting tool 66, in certain embodiments, is a diamond blade saw, but other types of saws or alterative cutting tools may be used.

Regarding positioning of the work piece relative to the cutting tool 66, as should be appreciated, exact placement is a necessity in order to ensure spacer work piece is cut to required length for the intended window assembly. In certain embodiments, such placement can be accomplished via one or more proximity sensors positioned at the first end 60 of the stage 32, opposite the stage second end 62 with cutting station 64. As should be appreciated, per the work job operation instructions transmitted to the controllers from the computer system 54, warranted length for the spacer work piece is known. Thus, exact positioning of work piece end at the stage first end 60 (via data from proximity sensor(s)) corresponds to an exact length of the work piece following cut by the tool 66.

Regarding the cutting process, in certain embodiments, the spacer work piece, once brought into the cutting stage 32, is deposited between spaced-apart channel blocks 68, each of which retains a portion of the work piece. The channel blocks 68 are positioned on a platform 70 extending along a length of the cutting stage 32, and, in certain embodiments, are movable in opposing directions across the width of the platform 70 to lock the spacer work piece's position there between. To that end, upon the spacer work piece being positioned and locked, the cutting tool 64 is powered and moved relative to the work piece to perform the cut. In certain embodiments, such action by the cutting tool 64 is a similar extension of the influence of the controllers, but instead of directing servo-motor, drive belt modules, and clamp as described above for transfer of spacer work piece from holding stage 38, action is directed to motor 72 and transport mechanism 74 of the cutting station 64 (via electrical coupling between controllers and cutting station 64). In certain embodiments, after the spacer work piece is cut to requisite length, the cut end of the work piece can be plugged, e.g., with foam material, at the cutting station 64, thereby eliminating loss of desiccant from cut end during subsequent transfer of the work piece within the cell 30.

Following such cutting (and optional plugging) operation (s), the work piece is transferred to key insertion stage 44 (as already referenced above yet not detailed). In certain embodiments, this transfer is conducted via shifting of the channel blocks 68 across width of the platform 70 toward a transport mechanism. In certain embodiments, such transport mechanism includes a bar 76 on which spaced-apart retainers 78 (e.g., "L" shaped brackets) are operably coupled to extend downward, i.e., hang, therefrom. In certain embodiments, the bar 76 is both movable in vertical and horizontal planes. To that end, the bar 76 is moved horizontally up to the channel blocks 68 on platform 70 and then is vertically raised. In doing so, the cut spacer work piece is lifted by the retainers 78, after which the bar 76 is horizontally moved toward the key insertion stage 44.

Figure 6:
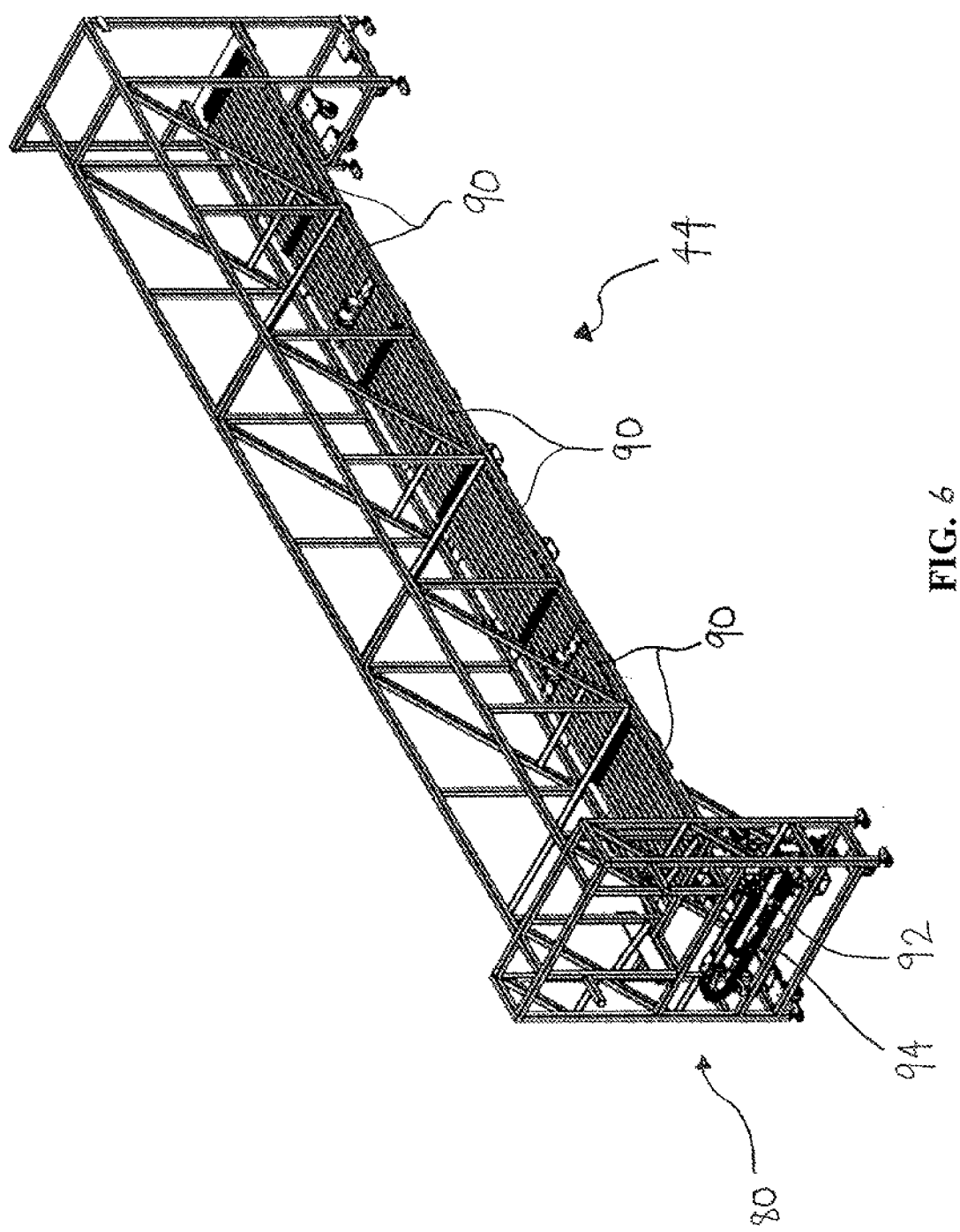
FIG. 6 is an overhead perspective view of a key insertion stage of the formation cell of FIGS. 3A and 3B in accordance with certain embodiments of the invention.
Figure 7:
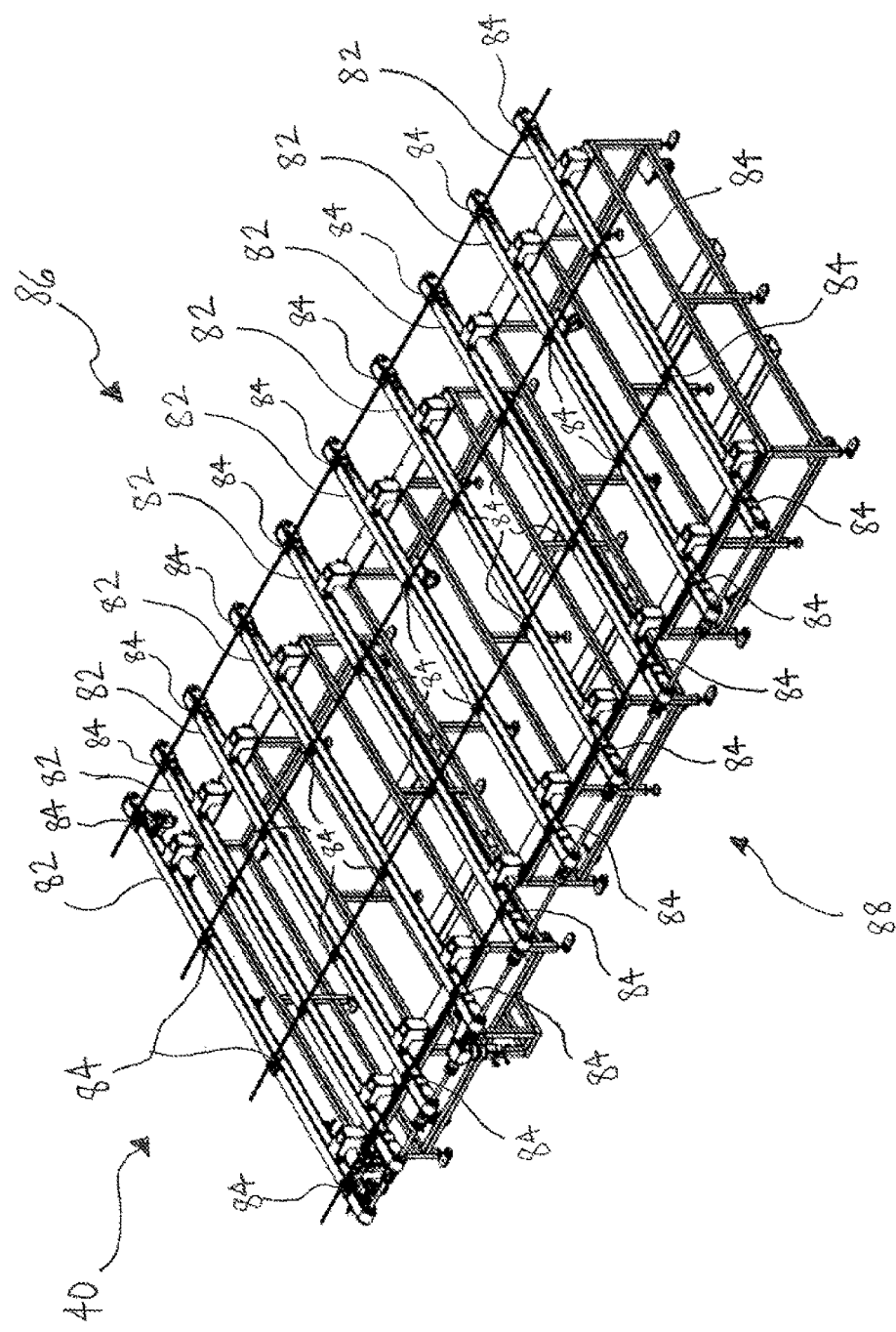
FIG. 7 is an overhead perspective view of a conveying stage of the formation cell of FIGS. 3A and 3B in accordance with certain embodiments of the invention.

FIG. 6 illustrates an overhead perspective view of the key insertion stage 44, while FIG. 7 shows an overhead perspective view of the conveying stage 40 (as already referenced above yet not detailed), each shown separate from the other stages of the formation cell 30 and in accordance with certain embodiments of the invention. The conveying stage 40 of FIG. 7 is described in combination with the key insertion stage 44 because these stages overlap, with portions of the key insertion stage 44 extending above the conveying stage 40. Particularly, the conveying stage 40 involves a transport mechanism involving a plurality of conveyors 82. On each conveyor 82 are spaced-apart holding stations 84, which are aligned with corresponding holding stations 84 on the other conveyors 82, such that the cut spacer work piece can be deposited in any of the aligned holding stations 84, and thereby extend perpendicularly across the conveyors 82. As described above, the bar 76 with spaced-apart retainers 78 picks up the cut spacer work piece from the cutting stage 32 and moves toward the key insertion stage 44. To that end, and with reference to FIGS. 3B and 7, outside the insertion stage 44 on beginning side 86 of the conveyor stage 40, the bar 76 is lowered, whereby the retainers 78 thereof descend between and below the conveyors 82 as they are halted. In doing so, the cut spacer work piece is inserted in one grouping of aligned holding stations 84. Once the work piece is unloaded, the bar 76 is horizontally shifted until the retainers 78 are moved clear of the work piece. In turn, the bar 76 is vertically raised and moved back toward the cutting station 32 for transfer of a next-cut work piece.

In certain embodiments, the holding stations 84 on at least one of the conveyors 82 (e.g., the conveyor 82 nearest to the cut end of the spacer work piece) are formed of clamps that can be closed on that portion of the spacer work piece once lowered therein. The spacer work piece is then transported therein via activation of the conveyors 82. With reference to FIGS. 3B and 6, as the spacer work piece is moved across conveyor stage 40 from starting side 86 to ending side 88, it enters the key insertion stage 44 and is halted when the end (e.g., cut end) of the work piece (and the holding stations 84 through which it extends) is aligned with the key station 80. As shown, in certain embodiments, the conveyors 82 pass underneath aligned key magazines 90 of the key station 80. While the work piece is halted in the key insertion stage 44, a picker mechanism 92 selects a corresponding sized key (connector) for the spacer work piece, and subsequently inserts the same in end (e.g., cut end) of work piece. Movement of picker mechanism 92, in certain embodiments, is enabled via transport mechanisms, e.g., driver belt modules 94, enabling movements of the mechanism 92 for the selecting and inserting actions. Upon insertion of the key connector, the spacer work piece is transported out of the stage 44 via further activation of the conveyors 82, toward the end side 88 of the conveyor stage 40.

Figure 8A:
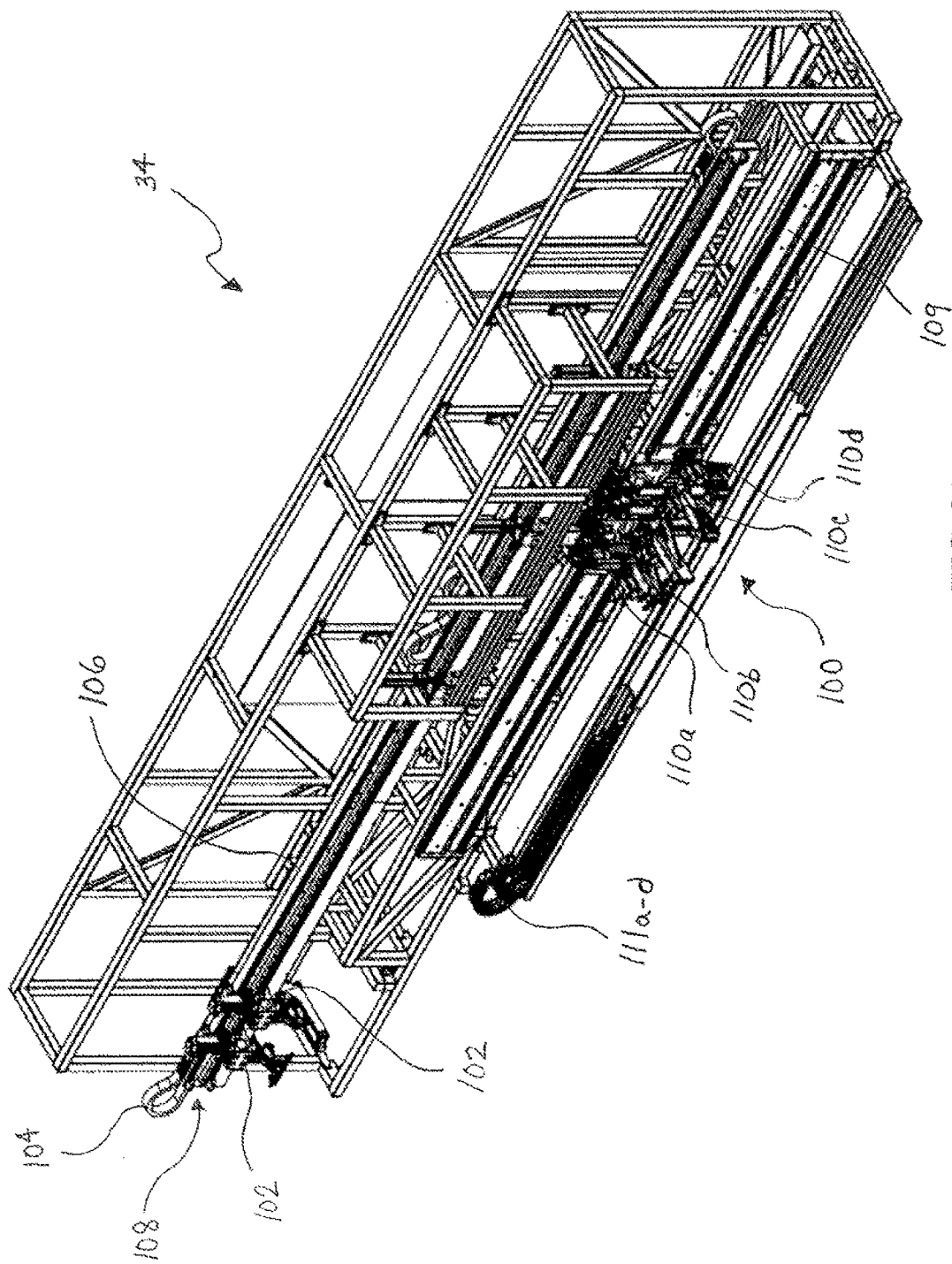
FIGS. 8A and 8B are overhead perspective and elevation views of a bending stage of the formation cell of FIGS. 3A and 3B in accordance with certain embodiments of the invention.
Figure 8B:
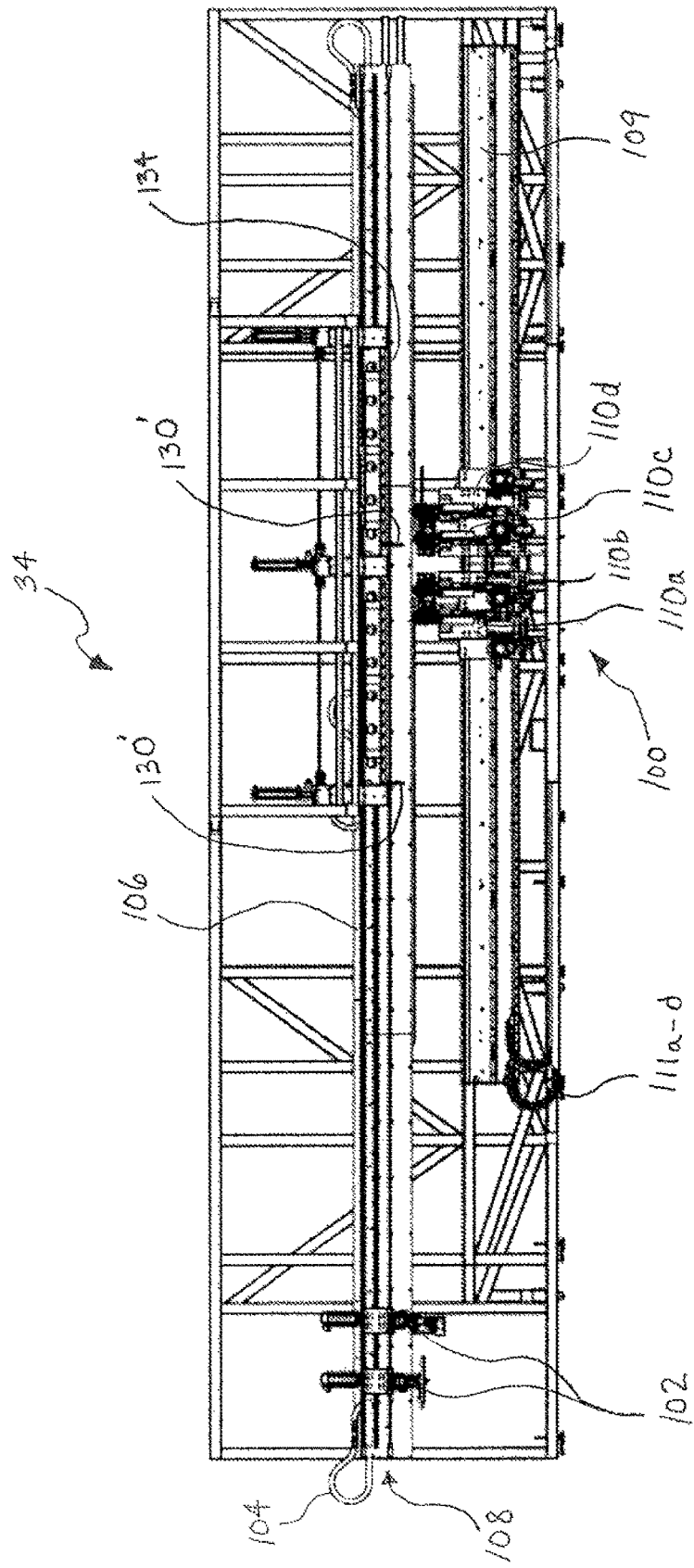

As described above, a further processing operation performed in the formation cell 30 occurs at the bending stage 34, and involves the spacer work piece being shaped (or bent) at locations along its length (pursuant to parameters of the window assembly for which it is intended). FIGS. 8A and 8B are overhead perspective and elevation views of the bending stage 34 (shown separate from the other stages of the formation cell 30) in accordance with certain embodiments of the invention. In certain embodiments, the spacer work piece is transported to the bending stage 34 from the conveying stage 40. For example, in certain embodiments, as the work piece nears the end side 88 of the conveyor stage 40, a further transport mechanism is used to grasp/lift the work piece from the conveyors 82 and move the work piece to a bending station 100 of the bending stage 34.

In certain embodiments, the further transport mechanism involves a pair of shuttle units 102 configured to be slid (via drive belt module 104) along a beam 106 extending the length of the bending stage 34. Each of the units 102, in certain embodiments, has closable jaws 105 extending therefrom, which are configured to be lowered, moved forward to surround, and then close upon the spacer work piece. In turn, the units 102 are slid along the beam 106 to the bending and tool exchange station 100, whereby the jaws (and held work piece) are correspondingly moved to the station 100. With reference to FIGS. 3B and 8A, in certain embodiments, the units 102 are each initially positioned next to each other at an end 108 of the beam 106 proximate to the conveying stage 40. To that end, in certain embodiments, the unit 102 nearest the station 100 is used to grasp, lift, and slide the spacer work piece (via its jaws), while the other unit 102 is temporarily delayed before similarly being slid along the beam 106, thereby serving more as a support for a lagging extent of the work piece.

Prior to being shaped at the bending stage 34, in certain embodiments, the spacer work piece is re-oriented. For example, with reference to FIG. 2, the spacer work piece can be generally stored (in holding stage 38) and cut (in cutting stage 32), and the connector key can be added thereto (in key insertion stage 44), with the spacer walls 12a/12b oriented vertically upward/downward or vice versa. However, for the bending operation (as is later described), the bends are made in a horizontal plane. As such, the spacer walls 12a/12b, across which the bends are to be directly exerted, need to be reoriented so they are perpendicular to such horizontal plane. Accordingly, in certain embodiments, the spacer work piece is rotated 90 degrees.

In certain embodiments, such reorientation is performed when the work piece is on the conveyors 82 of the conveying stage 40, following its exit from the key insertion stage 44. For example, a rotatable clamp (not visibly shown) can be stationed at the end side 88 of the conveying stage 40. To that end, when the conveyors 82 are stopped for transfer of the work piece to the bending stage 34, the clamp can be extended to surround and grasp an end of the work piece, and subsequently rotate such end (and correspondingly, the entirety of the work piece) by 90 degrees. Following such reorientation of the spacer work piece, the clamp can release and be lowered away from the work piece, after which the work piece is then transferred by the units 102 as described above. Although, embodiments of the invention should not be limited to use of a rotatable clamp for such reorientation of the work piece. For example, further functioning of the units 102 via their closable jaws 105 may account for such reorientation of the spacer work piece prior to bending operations, or such reorientation could be provided at the bending stage 34 prior to the bending operations being performed.

As described above, the shuttle units 102 transport the spacer work piece from the conveying stage 40 to the bending stage 34, and particularly, the bending station 100 thereof. Taking a moment to surmise the bending stage 34 as described to this point, it warrants no particular pre-forming of the spacer work piece (i.e., at the locations to be bent), and, as the need arises, can be varied for bending different types and/or sizes of spacer work pieces. As such, the cell's efficiency is enhanced (by limiting quantity of required processes leading up to the bending stage 34), as is the cell's versatility (by enabling spacer work pieces of differing types/sizes to be formable). In now detailing the bending stage 34, it will be appreciated how its operations and functionality further enhance the formation cell's efficiency.

Figure 8C:
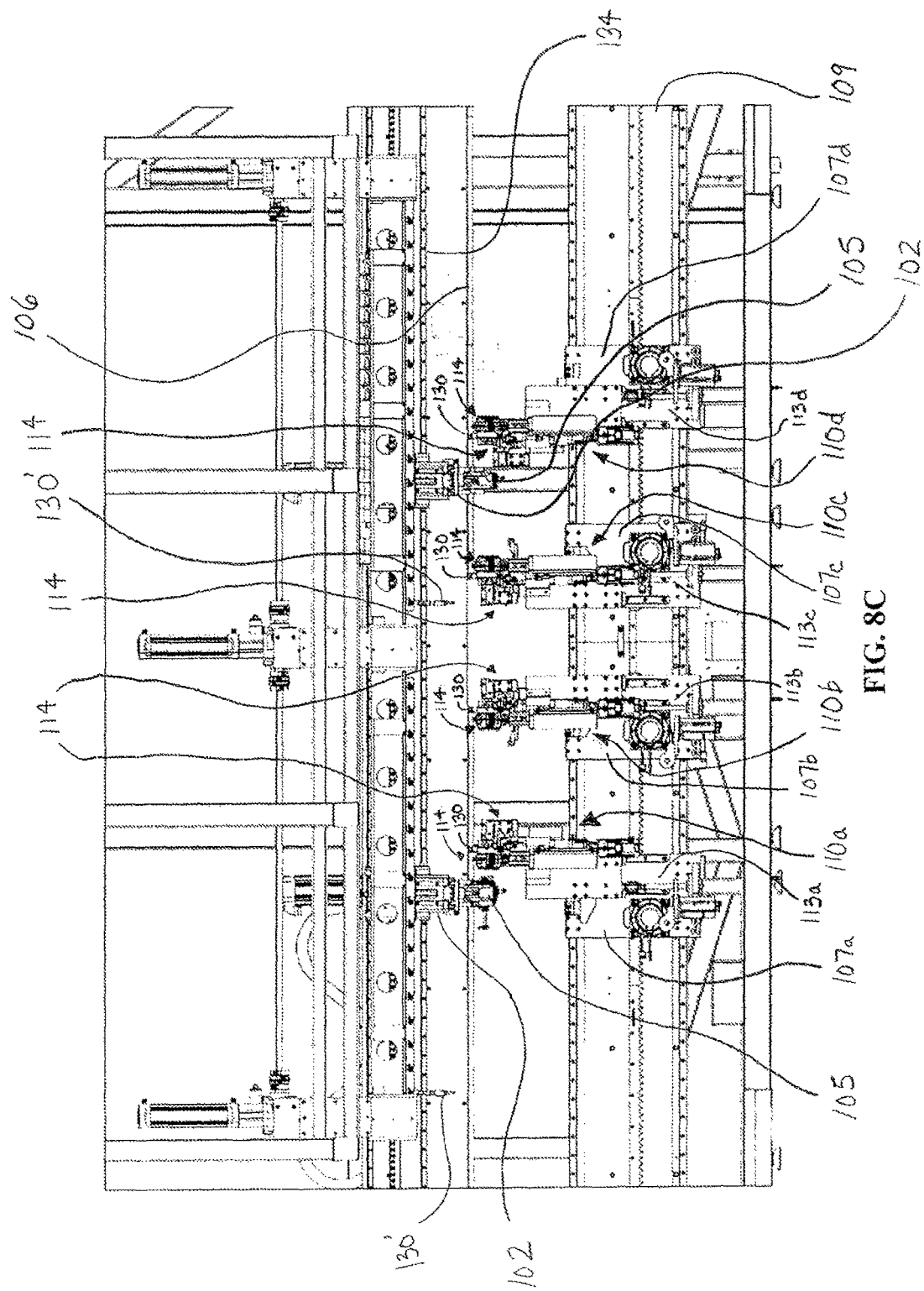
FIG. 8C is an enlarged elevation view of bending station of the bending stage of FIGS. 8A and 8B.

Starting with FIG. 8C, an enlarged elevation view of the bending station 100 of the bending stage 34 is shown. In performing bending operations on the spacer work piece, a plurality of bending heads 110a, 110b, 110c, and 110d are used (collectively referenced hereinafter as 110a-d). While the bending heads 110a-d are shown as being four in quantity, certain embodiments of the invention focus on providing pairs of bending heads, and particularly, at least two pairs. Thus, in the depicted case, two pairs of bending heads 110a, 110d and 110b, 110c are shown, with the operation of such pairings later described herein. With reference back to FIG. 3B, the bending heads 110a-d are aligned with each other along a front edge of a bending table 112. In certain embodiments with reference to FIGS. 8A-8C, the bending heads 110a-d are operably coupled to stations 107a-d that can be independently moved along a beam 109 offset from and situated below the bending table 112. To that end, the spacing of the bending heads 110a-d relative to each other can be adjusted via movement of the stations 107a-d along the beam 109 via independent drive mechanisms (e.g., collectively referenced as drive belts 111a-d). Upon being properly spaced with regard to the spacer work piece being delivered to the bending station 110, the bending heads 110a-d are raised relative to the bending table 112 via further independent drive mechanisms (e.g., pneumatic levers 113a-d) respectively coupled to the stations 107a-d. To that end, the bending heads 110a-d are raised to a height at which the spacer work piece is received from the shuttle units 102 (with the work piece extending across the heads 110a-d) and at which the bending operations can be conducted on the work piece relative to the bending table 112. The table 112 is used to support bent portions of the spacer work piece (during bending operations) and for subsequent transfer of the work piece from the bending stage 40 (as is later described). After releasing the work piece across the bending heads 110a-d, the units 102 travel back to the conveyor stage 40 to retrieve further spacer work piece.

Figures 8D, 8E:
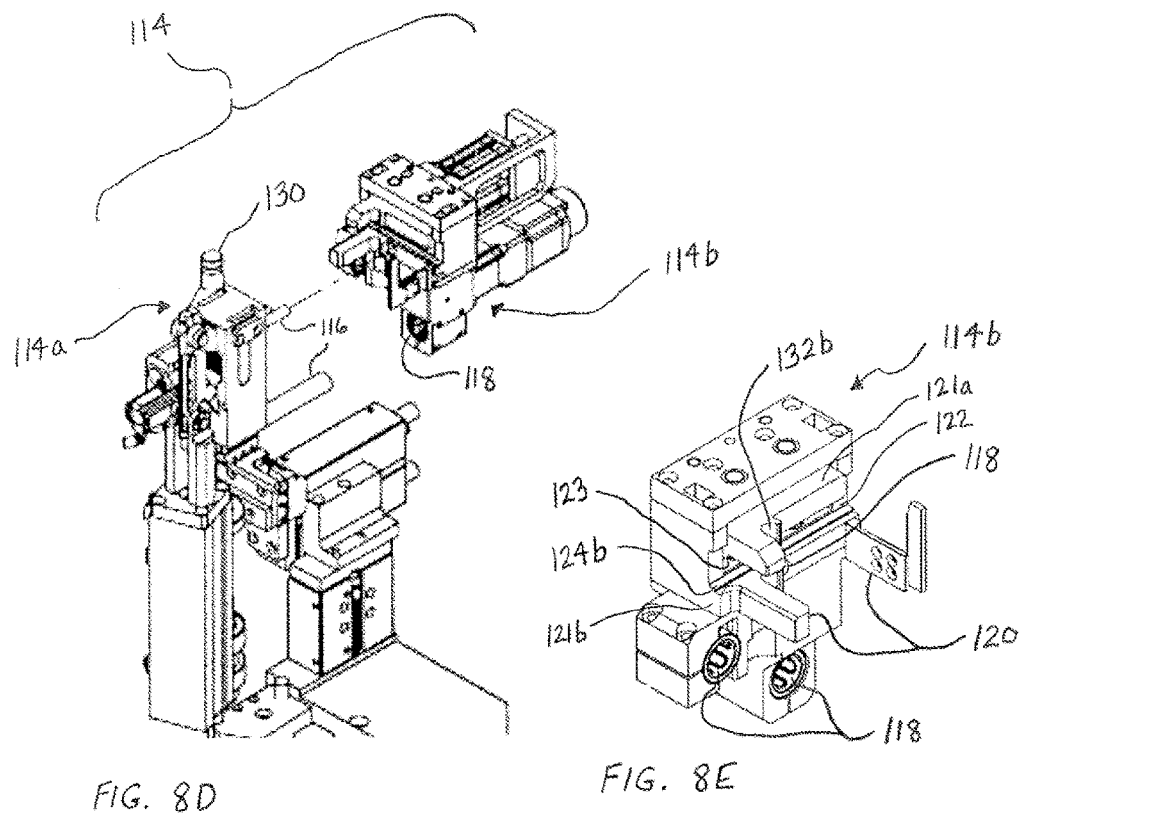
FIG. 8D is a partial exploded view of a clamp assembly of a bending head of the bending station shown in FIG. 8C in accordance with the certain embodiments of the invention.
FIG. 8E is a perspective view of an outer portion of the clamp assembly of FIG. 8D.
Figures 8F, 8G:
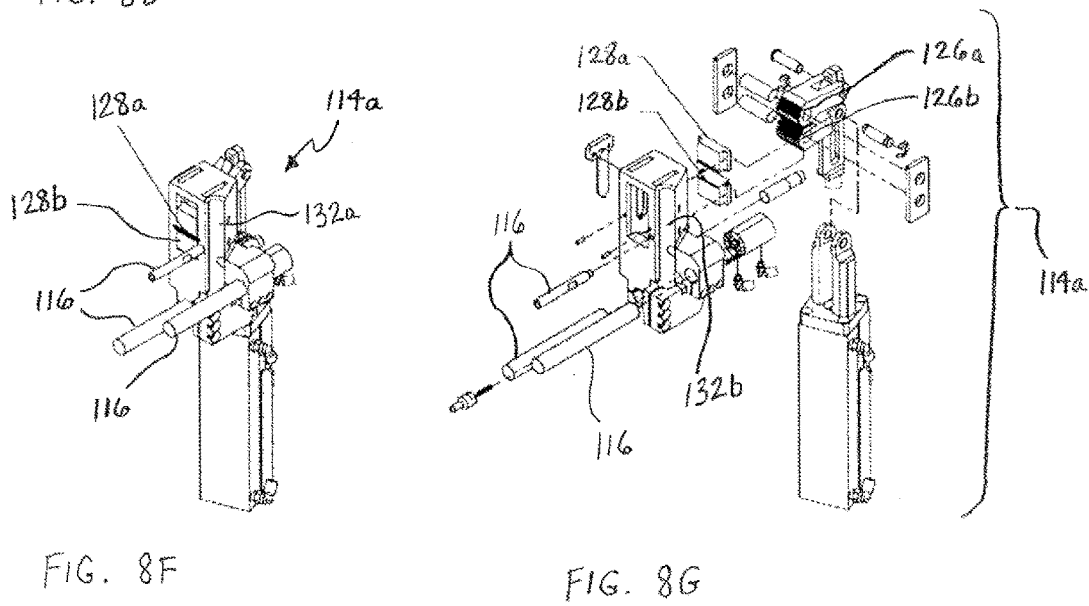
FIGS. 8F and 8G are perspective and full exploded views of an inner portion of the clamp assembly of FIG. 8D.

With continued reference to FIG. 8C, each of the bending heads 110a-d has a corresponding clamp assembly 114 adjustably coupled thereto consisting of inner and outer clamp portions 114a, 114b. To that end, when the spacer work piece is received by the bending heads 110a-d, the spacer work piece is actually received by the clamp assemblies 114 in open configuration, i.e., work piece extends between the inner and outer clamps 114a, 114b of each assembly 114. While the clamp assemblies 114 are referenced similarly herein, arrangements of the inner and outer clamp portions 114a, 114b on the assemblies 114 vary. The rationale behind such differing arrangements will be described later; however, at this point, it should be understood as being based on location of the bending head (and corresponding clamp assembly 114) along the spacer work piece. Regarding the clamp assemblies 114, and their inner and outer portions 114a and 114b, FIGS. 8D-8G are referenced. Particularly, FIG. 8D is a partial exploded view of a clamp assembly 114, showing an arrangement of the clamp portions 114a, 114b as used for bending heads 110c and 110d. To that end, FIG. 8E shows a perspective view of the outer clamp portion 114b, while FIGS. 8F and 8G illustrate perspective and exploded views of an inner clamp portion 114a. For convenience, the clamp portions 114a, 114b are herein referenced as "inner" or "outer" in view of their general position relative to the bending table 112. However, this should not be considered limiting, as the orientation of the spacer work piece could just as well be turned 180 degrees for the bending operations, whereby the orientations of the clamp portions relative to the bending table 112 could be reversed, wherein referencing herein of "inner" and "outer" would no longer be applicable. To that end, "first" and "second" could just as well be used in place of "inner" and "outer" with reference to the clamp portions 114a, 114b Starting with FIG. 8D, the inner and outer clamp portions 114a, 114b are shown separated. Such depiction is representative of how the inner and outer clamp portions 114a, 114b are adapted to pull apart, i.e., how the assembly 114 looks when in open configuration. However, as should be appreciated, the portions 114a, 114b would remain partially joined in the open configuration of the clamp assembly 114, whereby connecting pins 116 extending from the inner portion 114a would still in part extend into the corresponding receiving bores 118 of the outer portion 114b.

With reference to FIGS. 8E-8G, the inner and the outer clamp portions 114a, 114b each have self-regulating or -adjusting mechanisms to securely clamp spacer work piece extents. Starting with FIG. 8E, the outer clamp assembly 114b includes spaced-apart leg extensions 120 on which an extent of the spacer work piece is supported when the portions 114a, 114b are separated, and further defines a channel 122 sized to receive the work piece extent when the portions 114a, 114b are pulled together (in closed configuration of the clamp assembly 114). The channel 122 is configured with upper and lower tables 121a, 121b, wherein one of the tables 121a or 121b is biased toward the other. For example, in certain embodiments as shown, the upper table 121a, while biased toward the lower table 121b, extends from a pocket 123, such that the table 121a is able to vertically move in the pocket 123 relative to the lower table 121b to accommodate differing spacer work piece widths. As further shown, in certain embodiments (and with reference back to FIG. 2), the tables 121a, 121b of the channel 122 correspondingly define upper and lower angled outer surfaces (lips) 124a, 124b (only lower lip 124b being visibly shown) to align with opposing ear projections 12e of the spacer when the portions 114a, 114b are pulled together. Turning to FIGS. 8F and 8G, the inner clamp portion 114a is equipped with a set of upper and lower gears 126a, 126b configured to correspondingly separate upper and lower clamp pinions 128a and 128b upward and downward, respectively, when the clamp portions 114a, 114b are pulled together so as to clamp the ear projections 12e against the angled lips 124a, 124b.

Securely retaining the extents of the spacer work piece within the clamp assemblies 114 of the bending heads 110a-d, as described above, is required for the bending operations at the bending stage 40. Particularly, once such extents are securely clamped, portions of the work piece extending between the clamped extents can be tensioned as desired, e.g., via minimal horizontal movement of an outlying one of the bending heads 110a-d. Tensioning such segments is tantamount to stretching the segments, which has been found to be a favorable precursor for performing bends in the spacer work piece with minimized stress being produced in such bent areas. To that end, and with reference back to FIG. 8C, the inner and outer clamp portions 114a, 114b of each clamping assembly 114 are configured to seat a bending tool 130 between there. The extents of the spacer work piece clamped between the clamp portions 114a, 144b are positioned outward of (or distal to) the bending tool 130 along the work piece. As such, the clamp assemblies 114 provide clamping force outward of (or distal to) such tools 130. Thus, when a bending operation is performed with one of the bending heads 100a-d, whereby the corresponding clamp assembly 114 is rotated about its bending tool 130 (as further detailed below), the tensioned portion of the work piece includes the segment bent around the tool 130. With continued reference to FIG. 8C, in light of spacer work piece bends being oriented toward the bending table 112 and in light of the clamped extents of the spacer work piece being outward of (or distal to) the bending tools 130, the clamp assemblies 114 of bending heads 110a and 110b have mirror arrangements of the clamp assemblies 114 of bending heads 110c and 110d.

Figure 8H:
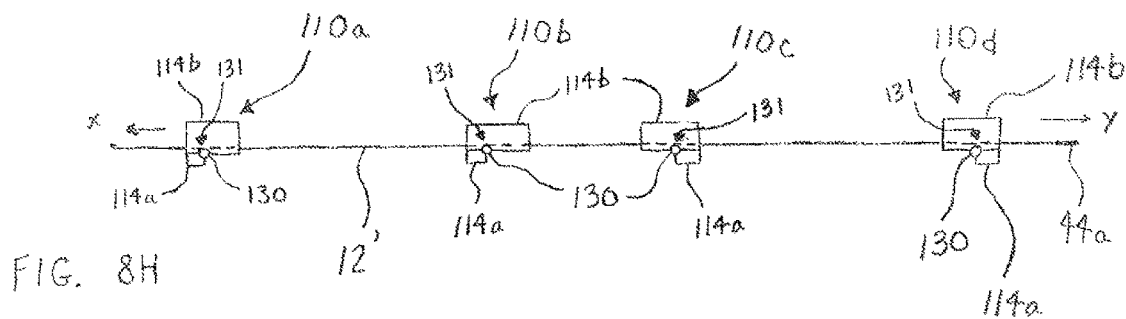
FIGS. 8H, 8I, 8J, and 8K are overhead views of the exemplary operations performed on a spacer work piece by clamping assemblies (shown in block form) of bending heads of the station shown in FIG. 8C in accordance with certain embodiments of the invention.

In consideration of the above, the operation of the clamp assemblies 114 of the bending heads 110a-d in bending the spacer work piece can be described. Reference is made to FIGS. 8H-8K, showing exemplary operations of the clamping assemblies 114 (shown in block form) on spacer work piece 12'. As described above, after positioning the bending heads 110a-d (i.e., their clamp assemblies 114) relative to bending points 131 along the spacer work piece 12', the bending heads 110a-d are raised to the work piece 12', thereby locating these points 131 between the clamp portions 114a, 114b. With reference to FIG. 8E, in certain embodiments, the bending points 131 of the work piece 12' are aligned with wells 132b of the outer clamp portions 114b, which are configured to align with corresponding wells 132a of the inner clamp portions to seat the bending tools 130 when the clamp portions 114a, 114b are pulled together. The clamp assemblies 114 are in turn actuated to their closed configurations. As such and as depicted in FIG. 8H, the clamp portions 114a, 114b are pulled together with the bending points 131 of the spacer work piece 12' being aligned with the bending tools 130, while extents of the work piece 12' distal to such bending points 131 are clamped between the inner and outer clamp portions 114a, 114b.

Figure 8I:
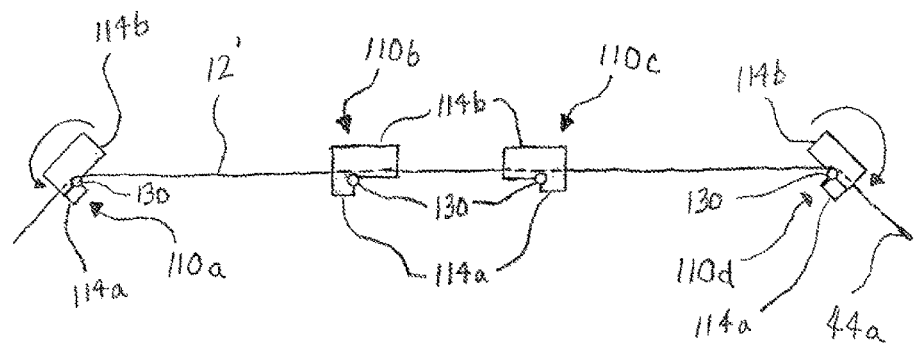
Figure 8J:
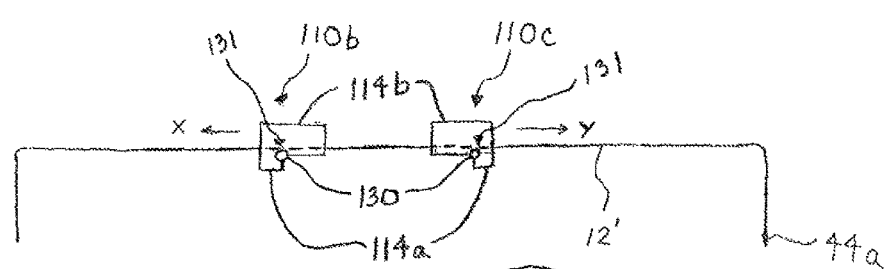
Figure 8K:
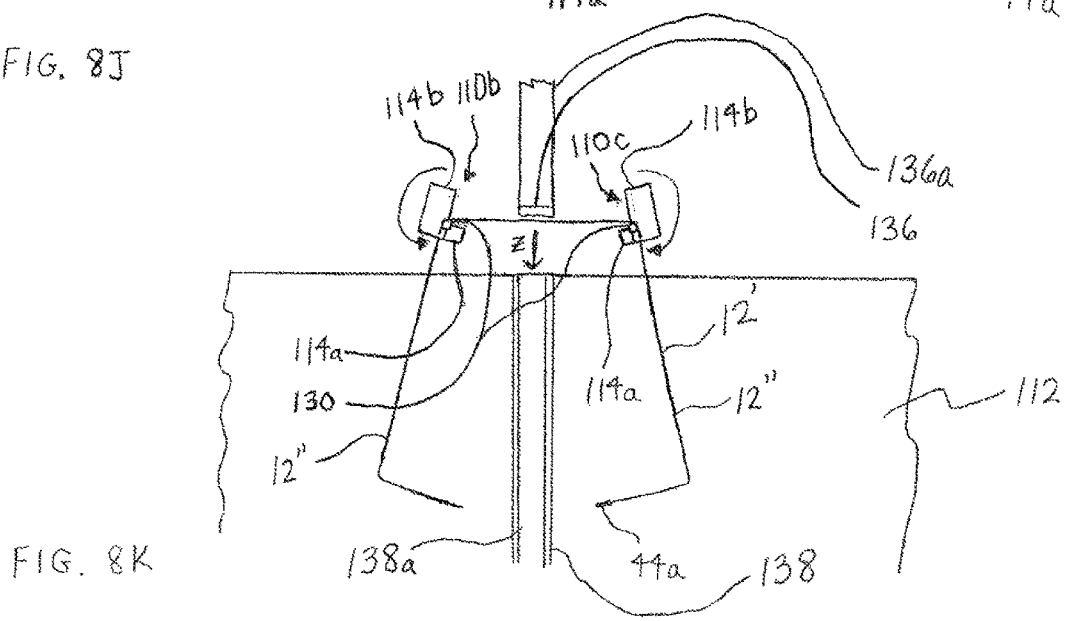

As described above, the bending heads 110a-d are provided in pairs. To that end, in certain embodiments, the clamping assemblies 114 of each bending head pairing is actuated at the same time to perform bends on the spacer work piece 12'. Accordingly, a pair of bends can be simultaneously made in the work piece 12'. As depicted in FIGS. 8H-8K, the pairs of bends are sequentially performed on the spacer work piece 12', from the outer ends of the work piece 12' and then subsequently inward. Thus, for typical window assemblies, i.e., having peripheries with four corners, the bending process of the formation cell 30 can be conducted with two corners being simultaneously formed in the spacer work piece 12'. Accordingly, as opposed to bending corners in the spacer work piece one at a time and dictating four bending steps, the bending process of the cell 30 can be performed in half the time, i.e., in two bending steps. FIGS. 8I and 8J depict the first of the two steps being conducted.

However, prior to the first step, an initial step relating to FIG. 8H involves introducing warranted tension at the bending points 131 of the work piece 12'. As should be appreciated, the warranted amount of tension varies for different types/sizes of spacer work piece and is one of the parameters transmitted to the controllers orchestrating the processes of the cell 30. To that end, in certain embodiments, such tension is applied to the sections extending between the clamped extents via minimal horizontal movement of outer ones of the corresponding bending heads 110 along the beam 109 (see FIGS. 8A-8C). For example, with reference to bending head 110a, it is moved horizontally in x direction to provide warranted tension on spacer work piece segment (including bending point 131) between the clamp assemblies 114 of bending heads 110a and 110b. Likewise, with reference to bending head 110d, it is moved horizontally in y direction to provide warranted tension on spacer work piece segment (including bending point 131) between the clamp assemblies 114 of bending heads 110d and 110c.

Upon introducing the warranted amount of tension across the clamped work piece segments, the first pair of bends is made. Such is depicted in FIG. 8I, wherein the clamp assemblies 114 of the outer bending heads 110a and 110d are rotated about their bending tools 130. To that end, not only is a pair of bends simultaneously formed, but the procedure involves moving the entirety of the clamp assembly 114. This ensures that same clamping force is maintained on the clamped work piece extents throughout the bending operation, and also involves a streamlined approach in terms of clamping, stretching, and bending steps. It should be appreciated that bending such work piece segments around bending tools 130 effectively increases the tensile force on the segment during the bending operation, i.e., causing further stretching of the segment; however, such is factored in the operation during prior horizontal movement of the bending heads 110a and 110d, so as to not adversely impact the operation.

Following the first pair of bends, the clamp assemblies 114 of the outer bending heads 110a and 110d are opened, and subsequently lowered relative to the bending table 112 (so as to not interfere with second pair of bends needing to be made to the spacer work piece 12'). This, as shown in FIG. 8J, only the clamp assemblies 114 of the inner pair of bending heads 110b and 110c are left in the bending plane to perform the second pair of bends in the work piece 12'. To that end, the above-described steps described for the clamp assemblies 114 of the outer bending heads 110a, 110d, with one exception. Particularly, only one of the bending heads 110b or 110c needs to be horizontally moved relative to the bending table 112 to introduce warranted tension on the segment extending between the corresponding clamp assemblies 114. Following such second pair of bending operations (depicted in FIG. 8K), the clamp assemblies 114 of the inner bending heads 110b and 110c are opened, and subsequently lowered relative to the bending table 112. To that end, and with reference to FIG. 3B, the clamp assemblies 114 remain below the table 112 temporarily while bent spacer work piece is conveyed to the connecting stage 36.

In continuing with the above, FIG. 8L is a flow diagram 200 of exemplary steps performed in forming a spacer work piece at the bending stage 34 in accordance with certain embodiments of the invention. An initial step 202 involves the bending heads (e.g., bending heads 110*a*, 110*d* and 110*b*, 110*c*) being moved to warranted positions along front edge of the bending table 112, i.e., to correspondingly position their clamp assemblies 114 at warranted bending point locations for the spacer work piece to be delivered to the bending stage 34. At step 204, the clamp assemblies 114 are raised relative to the bending table 112 in their open configurations, and the spacer work piece is received by the clamp assemblies 114, between their separated inner and outer clamp portions 114*a*, 114*b*. At step 206, the clamp assemblies 114 are actuated to their closed configurations, clamping the extents of the work piece passing between their corresponding clamp portions 114*a*, 114*b*.

Continuing with step 208 of the flow diagram 200, each of the outer pair of bending heads (e.g., 110*a* and 110*d*) along the bending table 112 are moved outward along table front edge to provide warranted tension on portions of the spacer work piece extending inward of their clamp assemblies 114. At step 210, the clamp assemblies 114 of the outer bending heads 110*a*, 110*d* are rotated around their corresponding bending tools 130 (and initially toward the bending table 112) to provide a corresponding initial pair of bends to the work piece. At step 212, the clamp assemblies 114 of the outer bending heads 110*a*, 110*d* are actuated to their open configurations and lowered below the bending table 112. At step 214, each of the next outer pair of bending heads (e.g., 110*b* and 110*c*) along the bending table 112 are moved outward along table front edge to provide warranted tension on portions of the spacer work piece extending inward of their clamp assemblies 114. At step 216, the clamp assemblies 114 of the outer bending heads 110*b*, 110*b* are rotated around their corresponding bending tools 130 (and initially toward the bending table 112) to provide a corresponding further pair of bends to the work piece. At step 218, the clamp assemblies 114 of the outer bending heads 110*b*, 110*b* are actuated to their open configurations and lowered below the bending table 112. At step 220, a determination is made whether there are any further clamp assembly pairings along the front edge of the bending table 112 to perform further operations on the spacer work piece. If so, the diagram loops to step 214; if not, the diagram moves to finish step 222, at which point bending operations for the spacer work piece are completed, such that the work piece can be conveyed to connecting stage 36.

If a differing type or size of spacer work piece is scheduled to be delivered to the bending stage 34, in certain embodiments, the clamp assemblies 114 can have their tooling (e.g., bending tool 130) changed out at the bending station 100. With reference back to FIGS. 8B and 8C, in certain embodiments, a carriage 134 is provided above the bending heads 110*a*-*d*, and carries a plurality of bending tools 130' joined, yet hanging from the carriage's underside. The carriage 134 is lowerable toward the bending table 112 for such tooling exchange. In certain embodiments, the tools 130 and 130' are rod-like in shape, yet have various tool profiles along their extents. Based on the rod-like shape of the tools 130 and 130', and their similar orientations, whether installed in the clamp assemblies 114 or hanging from the carriage 134, the tool change out can be performed with limited and straight-forward operations.

For example, in one procedure, the carriage 134 with replacement ending tools 130' is lowered to a level at or below the normal operating height of the clamp assemblies 114. The bending heads 110*a*-*d* are subsequently raised, with their clamp assemblies 114 being correspondingly raised above the bending table 112 (e.g. in closed configuration) so that the bending tools 130 of their clamping assemblies 114 can be slid out (from seated configuration between wells 132*a*, 132*b*) by the carriage 134. Such tool removal can involve orienting the tool(s) 130 to be removed with open tool receptacle(s) (e.g., receiving slot(s)) on the underside of the carriage 134, and raising the corresponding bending heads 110*a*-*d* (and thereby, their clamp assemblies 114) so that the bending tools 130 are received and held by the slots. Once the bending tool(s) 113 are removed from the corresponding assembly(ies) 114, the bending heads 110*a*-*d* are lowered and moved horizontally along the beam 109 so that the clamp assemblies 114 are aligned with replacement bending tool(s) 130' hanging from the carriage 134. In turn, the bending heads 110*a*-*d* are raised to receive such new set of tools 130' in the clamp assemblies 114. In turn, the carriage 134 can be raised outside of bending area, until future events again arise (i.e., type or size of spacer work is varied) so as to prompt another bending tool change out.

In continuing with the above, FIG. 8M is a flow diagram 300 of exemplary steps performed in changing bend tooling from the clamp assemblies 114 at the bending stage 34 in accordance with certain embodiments of the invention. An initial step 302 involves lowering the replacement tool carriage 134 proximate to the normal operating height of the clamp assemblies 114. At step 304, certain of the bending heads (e.g., and combination of 110*a*-*d*) at the bending stage 34 are raised, with their clamp assemblies 114 being correspondingly raised above the bending table 112 (e.g., in closed configuration). At step 306, the bending tools 130 of the raised clamping assemblies 114 are removed by the carriage 134. At step 308, the previously-raised bending heads are lowered and shifted so that the clamp assemblies 114 are aligned with replacement bending tool(s) 130' hanging from the carriage 134. At step 310, the previously-raised and shifted bending heads are again raised, with their correspondingly clamp assemblies 114 being correspondingly raised above the bending table 112. At step 312, the replacement set of tools 130' are correspondingly received by the raised clamp assemblies 114. Further, at step 314, the carriage 134 is raised away from bending table 112 and outside bending area, until future events again arise (i.e., type or size of spacer work is varied) so as to prompt another bending tool change out.

As described above, a final processing operation performed in the formation cell 30 occurs at the connecting stage 36, and involves joining the opposing ends of the bent spacer work piece, thereby forming closed loop for spacer end product. However, prior to entering the connecting stage 36, the spacer work piece needs to be correspondingly transferred from the bending stage 34. As previously noted, and with reference back to FIG. 3B, following completion of the bending operations at the bending stage 34, the bending table 112 for subsequent transfer of the bent spacer work piece. In certain embodiments, a protruding lever 136 is configured to slide across the table 112 via channel 138 therein. In certain embodiments, the channel 138 extends between the bending station 100 of the bending stage 34 and a lifting/conveying station 140 (i.e., the table 112 and lifting/conveying station 140 represent further transferring and/or reorienting stage 42 of the formation cell 30, previously referenced herein yet not described).

With reference back to FIG. 8K, upon the second pair of bends being formed in the spacer work piece 12', the protruding lever 136 is extended from the bending table 112 (via connecting slide 136*a*) so as to be held in contact with the work piece 12'. Upon the clamp assemblies 114 of the inner bending heads 110*b* and 110*c* being opened and subsequently lowered relative to the bending table 112, the connecting slide 136*a* is actuated to drive lever 136 in z direction toward the channel 138, thereby sliding work piece 12' in z direction (via contact from the lever 136). In turn, the lever 136 continues to slide work piece 12' across table 112 (along the channel 138), toward the lifting/conveying station 140. In certain embodiments, upon entering the channel 138, a plank 138*a* is raised from recessed position within the channel 138, thereby lifting lever 136 and slide 136*a* to a raised position relative to the channel 138. Such minimizes friction between work piece 12' and edges of the channel 138 as the work piece 12' is slid across the table 112 along the channel 138.

Figure 9:
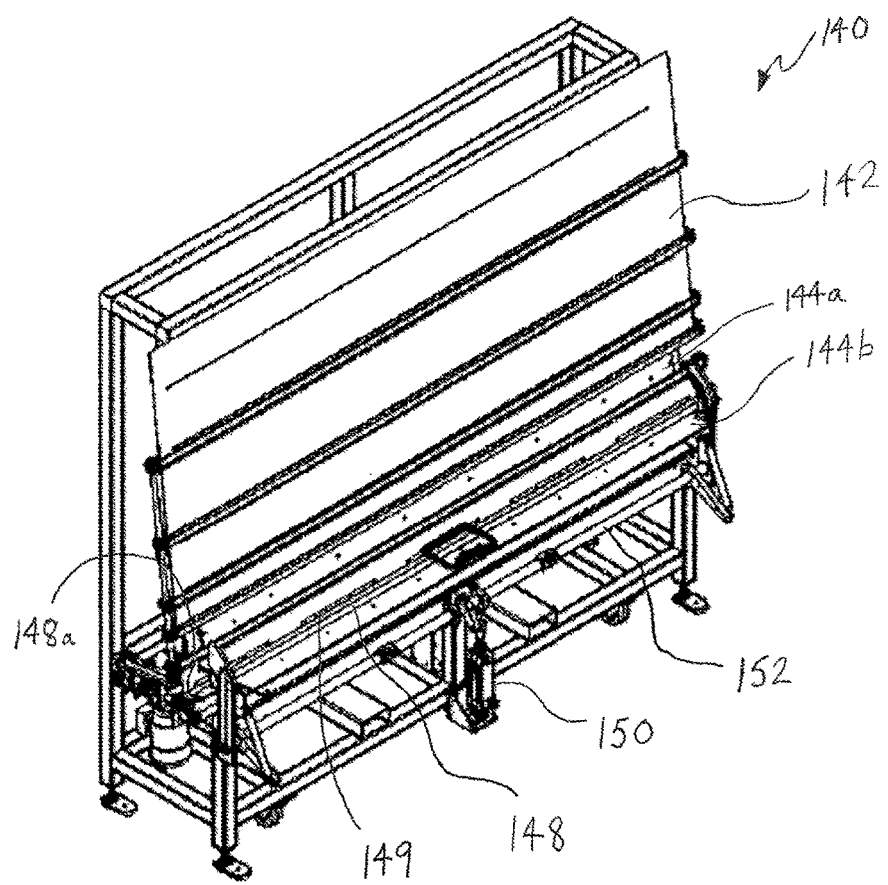
FIG. 9 is an overhead perspective view of a sliding/lifting stage of the formation cell of FIGS. 3A and 3B in accordance with certain embodiments of the invention.

The lifting/conveying station 140, in certain embodiments, has two primary functions, reorienting the bent spacer work piece so that the open side thereof (with opposing ends not joined) is better positioned for joining the work piece ends, and conveying the reoriented work piece to the connecting stage 36. Regarding these functions, reference is made to FIG. 9, which shows an overhead perspective view of the lifting/conveying station 140 (shown separate from other areas of the formation cell 30) in accordance with certain embodiments of the invention. The station 140 is equipped with an angled wall 142 and upper and lower tables 144*a*, 144*b* that are used in combination to form an elongated gap there between, in which longitudinal portions of the bent spacer work piece can be held and lifted to correspondingly raise the entirety of the work piece to a lifted position against the wall 142, prior to being conveyed along the wall to the connecting stage 36.

In certain embodiments, the lower table 144*b* is initially aligned with outer edge of the bending table 112, providing smooth transition for the bent spacer work piece when conveyed along the table 112 from the bending stage 34. With reference back to FIG. 8K, upon completion of the second pair of bends to the work piece 12', the unconnected ends of the spacer work piece 12' (one having key connector 44*a* inserted therein) are positioned in closer proximity with each other. Accordingly, the bent spacer work piece 12' is more representative of a rectangular shape, with the orientation of its elongated sides 12" being nearly parallel. In certain embodiments, the work piece 12' is slid across the bending table 112 (via lever 136 and slide 136*a*) and then across the lower table 144*b* of the lifting/conveying station 140, until the open side of the work piece 12' contacts the angled wall 142. At this point, the lever 136 and slide 136*a* return to the bending station 100. In the lifting/conveying station 140, the upper table 144*a* (e.g., initially forming a flush horizontal extent of the angled wall 142) is correspondingly actuated to rotate toward the lower table 144*b* to define the elongated gap surrounding opposing walls of the elongated sides 12" of the work piece 12.

As should be appreciated, the elongated gap represents a reorientation mechanism for the spacer work piece. To that end, when the upper and lower tables 114*a*, 144*b* are subsequently actuated so as to lift in unison toward the wall 142, the spacer work piece 12' is correspondingly lifted from the bending table 112 via contact between the work piece's elongated sides 12" and the lower table 144*b*. At the same time, the open end of the work piece 12' is rotated from contacting the wall 142 to contacting a transport mechanism (e.g., conveyor belt 148), situated to flank the lower edge of the angled wall 142. In certain embodiments, as shown, the conveyor belt 148 is lined with spaced apart material 149 (e.g., foam padding) so as to cushion the transfer of the work piece open end on to the conveyor belt 148. Upon the upper table 144*a* returning to its flush configuration within the wall 142, the work piece 12' is oriented in semi-prone position against the wall 142, at which point the conveyor belt 148 is then actuated to transport the work piece 12' out of the gap (formed by the tables 144*a*, 144*b*) to the connecting stage 36. A variety of mechanisms and techniques can be used to drive the lowering and lifting of the upper and lower tables 144*a*, 144*b*. For example, as shown, a pneumatic module 150 could be used in conjunction with a rod 152 extending between the ends of the lower table 144*b* to drive action of such table 144*b*. To that end, the same or like equipment could be similarly used for the upper table 144*a*.

Figure 10A:
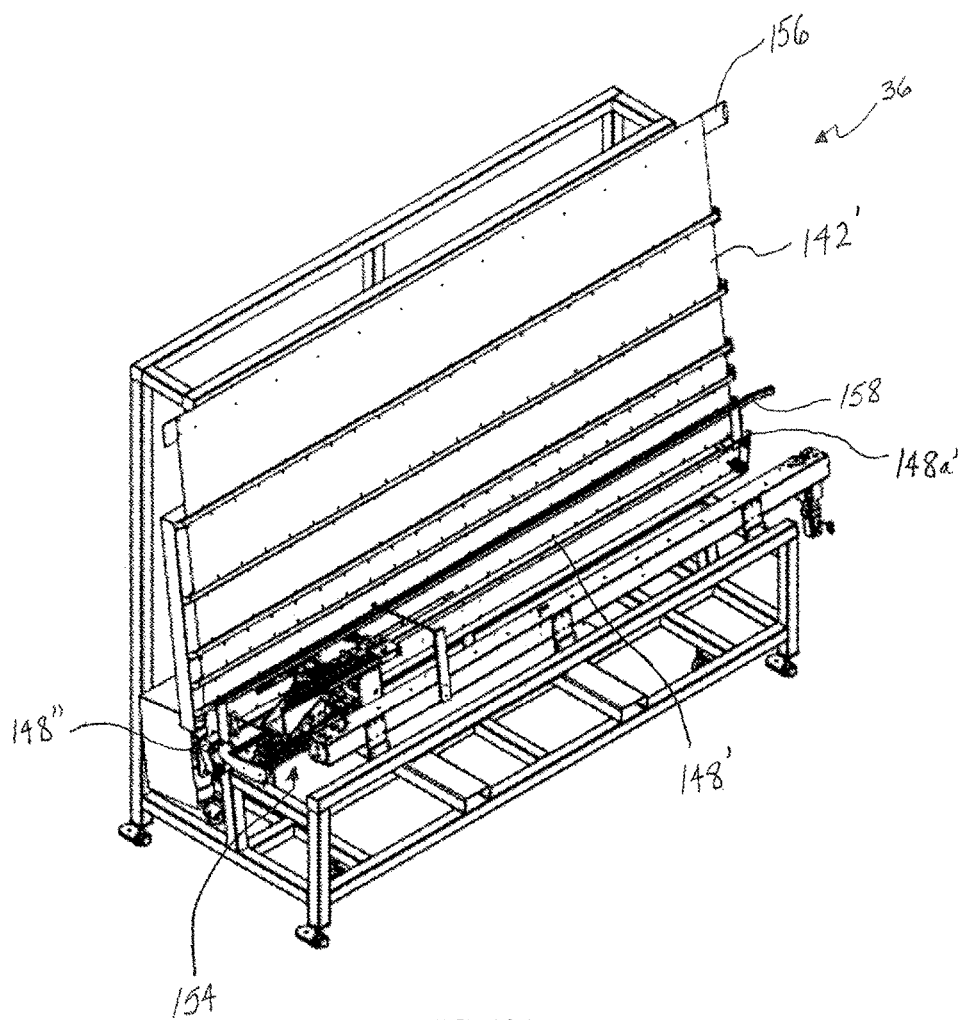
FIG. 10A is an overhead perspective view of a connecting stage of the formation cell of FIGS. 3A and 3B in accordance with certain embodiments of the invention.

FIG. 10A shows an overhead perspective view of a connecting stage 36 (shown separate from the other stages of the formation cell 30), while 10B shows a partial perspective view of connecting station 154 of the connecting stage 36, in accordance with certain embodiments of the invention. As described above, the connecting stage 36 is concerned with joining the opposing ends of the bent spacer work piece (via connector key 44*a*, already inserted in one end of the work piece via stage 44), and the spacer work piece is transferred to the connecting stage 36 from the lifting/conveying station 140, whereat the work piece is oriented to semi-prone position, with its open side at the bottom of the work piece. As such, the station 140 and stage 36 share many similarities, such as angled walls (142 in FIGS. 9 and 142' in FIG. 10A) and conveyor belt (148 in FIGS. 9 and 148' in FIG. 10A). As such, in certain embodiments, the station 140 and stage 36 are joined to provide as smooth as possible the transfer of the spacer work piece there between. For example, the corresponding walls 142, 142' are operably coupled to adjoin (e.g., via fastening of extension plate 156 at the top of wall 142'). Regarding the conveyor belts 148 and 148,' while not joined, in certain embodiments, they are situated at the same height and their corresponding end points (148*a* for station 140 and 148*a*' for stage 36) are extended so the work piece can be conveyed there between without issue.

However, as should be appreciated, upon being conveyed out of the gap defined between the lifted tables 144*a*, 144*b* of station 140, a corresponding structure was warranted for the connecting stage 36. To that end, in certain embodiments, a bar 158 is operably coupled to various structure extending outward in front of the wall 142'. The bar 158, extending across the wall's extent, is mounted a reasonable height above the conveyor belt 148' and spaced out from the wall 142' so as to not regularly contact the work piece, yet be positioned sufficiently proximate to prevent the work piece from shifting from the conveyor belt 148' as it is conveyed toward the connecting station 154. Although, in certain embodiments, foam padding can be spaced along the surface of the bar 158 directed toward the wall 142' to prevent possible damage to the spacer work piece during inadvertent contact.

Figure 10B:
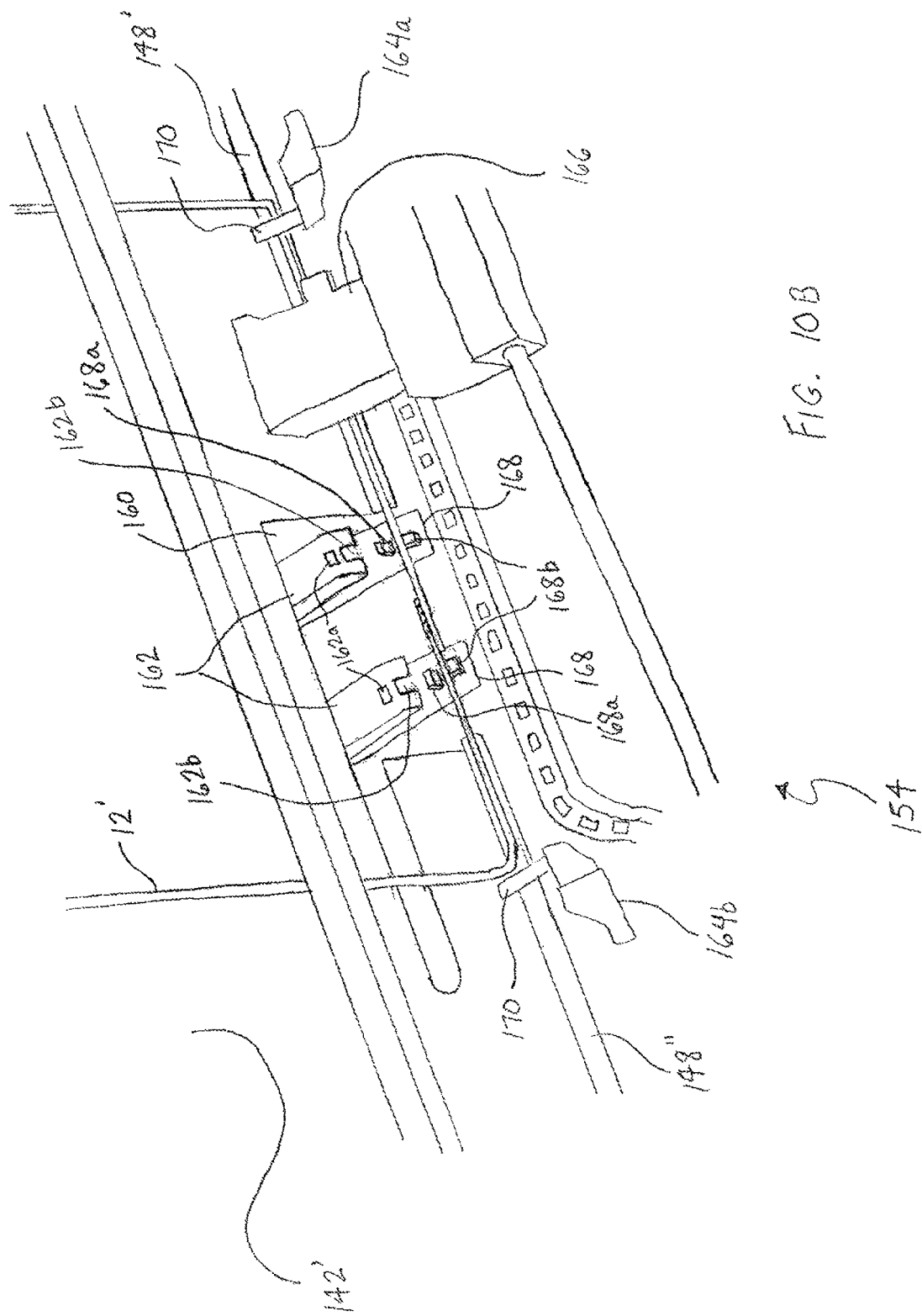
FIG. 10B is a partial perspective view of connecting station of the connecting stage of FIG. 10A.

As described above, the work piece is transferred by conveyor belt 148' to the connecting station 154, and particularly to a connecting window 160 thereof. Regarding operations at the connecting station 154, FIG. 10B is referenced. As should be appreciated, exact placement of the open ends of the spacer work piece is needed to coordinate connecting operation. As such, in certain embodiments as shown, the conveyor belt 148' ends at a front side of the connecting window 160, while a further conveyor belt 148" begins at the backside of the window 160. To that end, conveyance of the spacer work piece, particularly the open ends of the work piece, stop in front of the window 160. To ensure warranted placement of the ends with respect to connecting heads 162 extending from the connecting window 160, a plurality of positioning mechanisms are situated at or around the window 160. In certain embodiments, shifting/halting mechanisms 164a, 164b are respectively situated at front and back sides of the window 160, and an aligning module 166 is centrally positioned outside the window 160 of the connecting station 154. Further, in certain embodiments, spaced-apart platforms 168 aligning with the connecting heads 162 are positioned in gap between the conveyor belts 148' and 148". The shifting/halting mechanisms 164a and 164b are positioned at a height above the conveyor belts 148' and 148", respectively, and are configured to move away and toward the wall 142a' as well as back and forth along the wall 142a', as is warranted. In contrast, the aligning module 166 is configured to move back and forth along the connecting window 160. Finally, the platforms 168 have back wall extensions 168a which are configured to block the work piece ends from shifting toward the wall 142'. A variety of mechanisms and techniques can be used to drive the above-noted mechanisms (connecting heads 162, shifting/halting mechanisms 164a, 164b, and aligning module 166. For example, any combination of pneumatic and electrical modules drive could be used.

Given the above parameters as a backdrop, their exemplary use is described with respect to the connecting operation. At start, the front side shifting/halting mechanism 164a is set back away from the wall 142', while the back side mechanism 164b is moved toward the wall 142', thus blocking path above the conveyor belt 148" (e.g., via an extension tab 170 thereof contacting the wall 142'). As such, the spacer work piece is permitted to move toward the connecting window 160; however, as described above, due to the gap between conveyor belts 148' and 148", the open ends of the work piece halt in front of the connecting window 160, resting on the platforms 168 in front of back wall extensions 168a thereof. Once halted, the module 164 is activated to configured to position the spacer work piece open ends (and connector key 44a) between the connecting heads 162. To that end, in certain embodiments, the leading portion of the work piece is advanced forward and brought in contact with extension tab 170 of back side shifting/halting mechanism 164b. In doing so, the connecting key 44a (provided on leading open end of the work piece) is correspondingly situated between the platforms 168 (and connecting heads 162 aligned therewith). In this process, the module 164 also positions the lagging open end of the work piece to overlap with the connector key 44a and opposing open end, as shown in FIG. 10B. To that end, the front side shifting/halting mechanism 164a is actuated to be brought toward wall 142' within loop of the work piece (again, as shown in FIG. 10B), and then shifted back along the wall 142' or upstream along the conveyor belt 148' to pull the lagging open end of the work piece back from the opposing open end and key connector 44a.

Following the above, the connecting heads 162 and their complementary alignment mechanisms are actuated. Particularly, the heads 162 are lowered in the connecting window 160. In certain embodiments, the connecting heads 162 mate with the corresponding platforms 168 in key/key hole manner. As described above, the platforms 168 correspondingly align with, yet are stationed between the conveyor belts 148' and 14" to support the spacer work piece open ends. To that end, in certain embodiments, the platforms 168 have levers 168b which are configured to rotate upward, such that the spacer work piece open ends are surrounded on sides toward and away from the wall 142' via the back wall extensions 168a and the levers 168b for precise alignment of the open ends for connecting. Accordingly, the connecting heads 162 are defined with bore 162a and recess 162b, through which the back wall extensions 168a and the levers 168b of the platforms 168 can mate. Thus, the connector heads 162 are moved from the connecting window 160 to mate with the corresponding platforms 168, securing extents of the work piece offset from the ends. To that end, upon the work piece extents secured within the heads 162, one of the heads is shifted toward the other to connect the ends via the key connector 44a. Following the connection, heads are lifted from the platforms 168, the levers 168b rotate away from the work piece, and back side shifting/halting mechanism 164b is shifted away from the wall 142'. In turn, the front side shifting/halting mechanism 164a is moved along the conveying belt 148', thereby advancing connected spacer to the conveyor belt 148", from which the final spacer end product is moved for later use in fabricated window assembly for which the spacer is intended.

In continuing with the above, FIG. 10C is a flow diagram 400 of exemplary steps performed in orienting and connecting open ends of a spacer work piece in accordance with certain embodiments of the invention. An initial step 402 involves receipt of a work piece along lower table 144b of lifting/conveying station 140, wherein open side of the work piece makes contact with an angled wall of the station 140. At step 404, an upper table 144a, initially forming segment of angled wall, rotates downward toward the lower table 144b to define an elongated gap there between that surrounds elongated sides of the work piece. At step 406, the upper and lower tables 144a, 144b are lifted in unison toward the wall 142, thereby lifting spacer work piece in the process and rotating open side of the work piece toward conveyor belt 148 flanking a lower edge of the angled wall 142. At step 408, the semi-prone spacer work piece is transported out of the gap between the upper and lower tables via the conveyor belt 148 and on to conveyor belt 148' of the connecting stage 36.

Continuing with the flow diagram at step 410, at step 410, the conveyor belt 148' of the connecting stage 36 transfers the semi-prone work piece along an angled wall to connecting station 154. At step 412, conveyance of work piece is halted at connecting station 154, as conveyor belt 148' ends, whereby the work piece open ends are positioned outside a connecting window 160 of the connecting station 154 and supported via spaced-apart platforms 168. At step 414, an alignment module 166 positioned proximate to the connecting window 166 advances the spacer work piece so as to partially extend onto a further conveyor belt 148" before hitting a stop, at which point a key connector 44a protruding from one of the spacer open ends is positioned between the platforms 168. At step 416, the opposing open end of the work piece is spaced back from the key connector yet extending between the platforms 168. At step 418, the connector heads 162 are moved to mate with the platforms 168. At step 420, one head/platform pairing is moved toward the other head/platform pairing to connect the open ends of the spacer work piece via the key connector 44a. At step 422, the connector heads 162 are lifted from the platforms 168. At step 424, the connected spacer is conveyed from the connecting stage via further conveyor belt 148".

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention.

What is claimed is:

1. A cell for forming a spacer usable in configuration of a window assembly, the cell comprising:
   a plurality of stages through which a spacer work piece is routed, the stages including a bending stage and a connecting stage;
   the bending stage including a plurality of bending heads and a bending table, the bending heads aligned and in spaced-apart orientations with an edge of the table and selectively movable along the bending table edge, each bending head being equipped with a clamp assembly, the clamp assemblies being vertically displaceable relative to the bending table, the clamp assemblies seating corresponding bending tools therein, the clamp assemblies configured for securing retaining extents of the spacer work piece and being entirely rotatable about the tools, wherein each clamp assembly consists of inner and outer clamp portions, each of the portions equipped with self-adjusting mechanisms to accommodate differing types and sizes of the spacer work piece; and
   the connecting stage including an angled wall, a pair of connecting heads, and a transport mechanism, the transport mechanism comprising a pair of spaced apart conveyor belts separated by a connecting window defined in the wall, the connecting heads extending from the connecting window and configured to mate with corresponding pair of platforms situated between the spaced-apart conveyor belts, whereby positioning of the open ends of the spacer work piece between the platforms enables the connecting heads to mate and shift collectively with the stations in joining the open ends together.

2. The cell of claim 1, wherein the plurality of stages further comprise a holding stage and a cutting stage positioned upstream of the bending and connecting stages, the plurality of stages arranged in interlinked configuration and grouped together via a framework, the framework forming an exterior enclosure for the stages of the cell.

3. The cell of claim 2 wherein the stages are configured in a rectangular-shaped grouping, around which operations on the spacer work piece are conducted in roundabout manner, Wherein at least a majority of the stages are observable by an operator from single vantage points around the cell.

4. The cell of claim 2, wherein the holding stage includes a plurality of holding stations in which different spacer work pieces are separately retrievable.

5. The cell of claim 4 wherein each of the holding stations defines a channel extending across a length of the holding stage, each channel sized to accommodate only a single column of vertically-stacked spacer work pieces therein.

6. The cell of claim 5 wherein the channels are defined by spaced-apart plates, wherein the plates of one or more of the holding stations are selectively adjustable to vary widths of the channels.

7. The cell of claim 2, wherein the cutting stage includes a cutting station equipped with cutting tool.

8. The cell of claim 7, further comprising a further transport mechanism configured to transfer the spacer work piece from the bolding stage to the cutting stage and locate the work piece relative to the cutting tool for cutting operation.

9. The cell of claim 1 wherein the inner clamp portion defines a pocket via upper and lower tables, one of the tables vertically movable relative to other of the tables to account for differing widths of the spacer work piece.

10. The cell of claim 9 wherein the outer clamp comprises a pair of pinions, each of which is vertically adjustable to align with the upper and lower tables of the inner clamp portion and securely the extent of the spacer work piece there between.

11. The cell of claim 1 further comprising a station between the bending and connecting stages for reorienting the spacer work piece, the station including further angled wall and pair of spaced-apart tables operably coupled to the wall, the tables movable relative to each other to define a gap to surround elongated sides of the spacer work piece and movable together to orient the spacer work piece against the wall.

12. The cell of claim 11, wherein the angled wall and further angled wall are operably joined to form aligned surfaces along which the work piece is conveyable from the station to the connecting stage.

13. A cell for forming a spacer usable in configuration of a window assembly, the cell comprising:
   a plurality of stages through which a spacer work piece is routed, the stages including bending stage and a connecting stage;
   the bending stage including a plurality of bending heads and a bending table, the bending heads aligned and in spaced-apart orientations with an edge of the table and selectively movable along the bending table edge, each bending head being equipped with a clamp assembly, the clamp assemblies being vertically displaceable relative to the bending table, the clamp assemblies seating corresponding bending tools therein, the clamp assemblies configured for securing retaining extents of the spacer work piece and being entirely rotatable about the tools; and
   the connecting stage including an angled wall, a pair of connecting heads, and a transport mechanism, the transport mechanism comprising a pair of spaced apart conveyor belts separated by a connecting window defined in the wall, the connecting heads extending from the connecting window and configured to mate with corresponding pair of platforms situated between the spaced-apart conveyor belts, whereby positioning of the open ends of the spacer work piece between the platforms enables the connecting heads to mate and shift collectively with the stations in joining the open ends together;
   wherein the plurality of stages further comprise a holding stage and a cutting stage positioned upstream of the bending and connecting stages, the plurality of stages arranged in interlinked configuration and grouped together via a framework, the framework forming an exterior enclosure for the stages of the cell;
   wherein the stages are configured in a rectangular-shaped grouping, around which operations on the spacer work piece are conducted in roundabout manner, wherein at least a majority of the stages are observable by an operator from single vantage points around the cell; and
   wherein an inner area of the cell is vacant, said area sized for an operator to be positioned and monitor all of the stages of the cell from single location.

14. A cell for forming a spacer usable in configuration of a window assembly, the cell comprising:
   a plurality of stages through which a spacer work piece is routed, the stages including a bending stage and a connecting stage;

the bending stage including a plurality of bending heads and a bending table, the bending heads aligned and in spaced-apart orientations with an edge of the table and selectively movable along the bending table edge, each bending head being equipped with a clamp assembly, the clamp assemblies being vertically displaceable relative to the bending table, the clamp assemblies seating corresponding bending tools therein, the clamp assemblies configured for securing retaining extents of the spacer work piece and being entirely rotatable about the tools; and the connecting stage including an angled wall, a air of connecting heads, and a transport mechanism, the transport mechanism comprising a pair of spaced apart conveyor belts separated by a connecting window defined in the wall, the connecting heads extending from the connecting window and configured to mate with corresponding pair of platforms situated between the spaced-apart conveyor belts, whereby positioning of the open ends of the spacer work piece between the platforms enables the connecting heads to mate and shift collectively with the stations in joining the open ends together;

wherein the plurality of stages further comprise a holding stage and a cutting stage positioned upstream of the bending and connecting stages, the plurality of stages arranged in interlinked configuration and grouped together via a framework, the framework forming an exterior enclosure for the stages of the cell;

wherein the cutting stage includes a cutting station equipped with cutting tool; and wherein the cutting stage has a longitudinal extent along which the spacer work piece is locatable, wherein the cutting station is positioned at one end of the longitudinal extent and one or more sensors are positioned at an opposing end of the longitudinal extent, the one or more sensors configured for providing proximity information of the transferred spacer work piece.

15. A cell for forming a spacer usable in configuration of a window assembly, the cell comprising:

a plurality of stages through which a spacer work piece is routed, the stages including a bending stage and a connecting stage;

the bending stage including a plurality of bending heads and a bending table, the bending heads aligned and in spaced-apart orientations with an edge of the table and selectively movable along the bending table edge, each bending head being equipped with a clamp assembly, the clamp assemblies being vertically displaceable relative to the bending table, the clamp assemblies seating corresponding bending tools therein, the clamp assemblies configured for securing retaining extents of the spacer work piece and being entirely rotatable about the tools; and the connecting stage including an angled wall, a pair of connecting heads, and a transport mechanism, the transport mechanism comprising a pair of spaced apart conveyor belts separated by a connecting window defined in the wall, the connecting heads extending from the connecting window and configured to mate with corresponding pair of platforms situated between the spaced-apart conveyor belts, whereby positioning of the open ends of the spacer work piece between the platforms enables the connecting heads to mate and shift collectively with the stations in joining the open ends together;

wherein the bending stage further includes a carriage carrying a plurality of replacement bending tools from an underside of the carriage, the carriage situated above and vertically displaceable relative to the bending table, wherein the clamp assemblies are alignable with the replaceable bending tools of the carriage.

16. The cell of claim 15 wherein the bending tools of the clamp assemblies and the replacement bending tools carried by the carriage have similar shape and orientation, wherein only vertical displacement of the clamp assemblies relative to the carriage is warranted for removal of the bending tools from the clamp assemblies and insertion of the replacement bending tools in the clamp assemblies.

\* \* \* \* \*